United States Patent [19]
Eyuboglu et al.

[11] Patent Number: 5,541,852
[45] Date of Patent: Jul. 30, 1996

[54] DEVICE, METHOD AND SYSTEM FOR VARIABLE BIT-RATE PACKET VIDEO COMMUNICATIONS

[75] Inventors: M. Vedat Eyuboglu, Concord; Mei Yong, Canton; Oin-Fan Zhu, Stoughton, all of Mass.

[73] Assignee: Motorola, Inc., Schuamburg, Ill.

[21] Appl. No.: 227,847

[22] Filed: Apr. 14, 1994

[51] Int. Cl.⁶ .................................................. H04L 12/00
[52] U.S. Cl. ........................................ 364/514 C; 370/60
[58] Field of Search ................... 364/514 C; 375/1; 370/60, 84, 112; 358/425, 426, 431; 348/415, 405

[56] References Cited

U.S. PATENT DOCUMENTS

| | | | |
|---|---|---|---|
| 4,679,191 | 7/1987 | Nelson et al. | 370/84 |
| 4,727,495 | 2/1988 | Cheetham et al. | 364/514 C |
| 4,745,559 | 5/1988 | Willis et al. | 364/514 C |
| 4,771,391 | 9/1988 | Blasbalg | 364/514 C |
| 5,134,476 | 7/1992 | Arauiud et al. | 348/415 |
| 5,231,484 | 7/1993 | Gonzales et al. | 348/405 |
| 5,280,498 | 1/1994 | Tymes et al. | 375/1 |

Primary Examiner—Emanuel T. Voeltz
Assistant Examiner—Thomas Peeso
Attorney, Agent, or Firm—Darleen J. Stockley

[57] ABSTRACT

The present invention provides a device, method, and system for, in an entry node of a packet communication network, transcoding a received constant bit-rate video bitstream to a variable bit-rate video bitstream, packetizing the variable bit-rate video bitstream into video packets for efficient transport of a video signal over a packet-switched network.

33 Claims, 12 Drawing Sheets

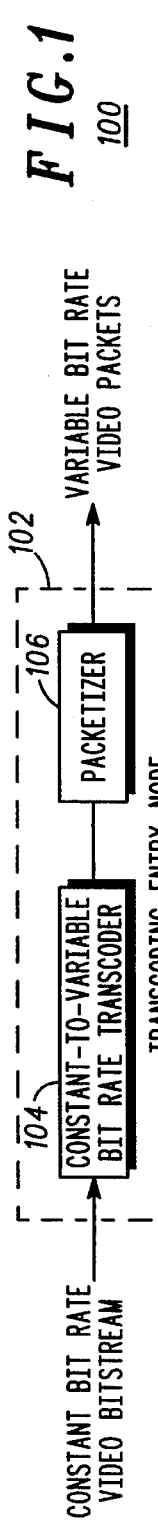
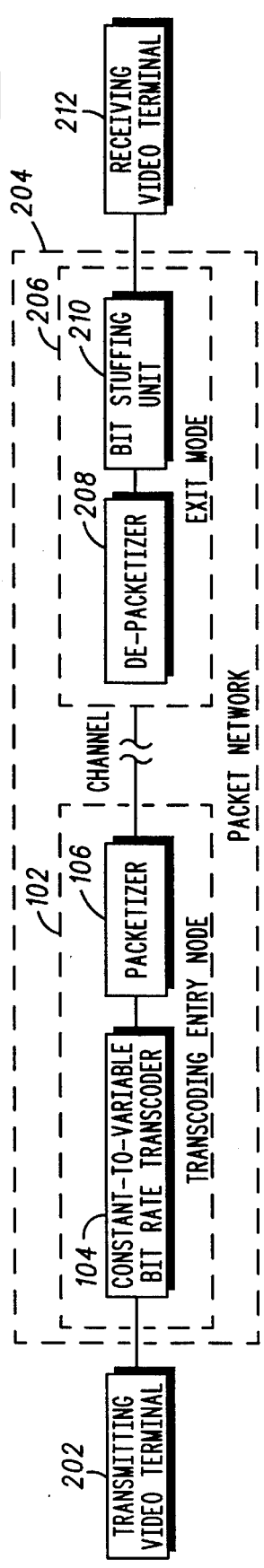
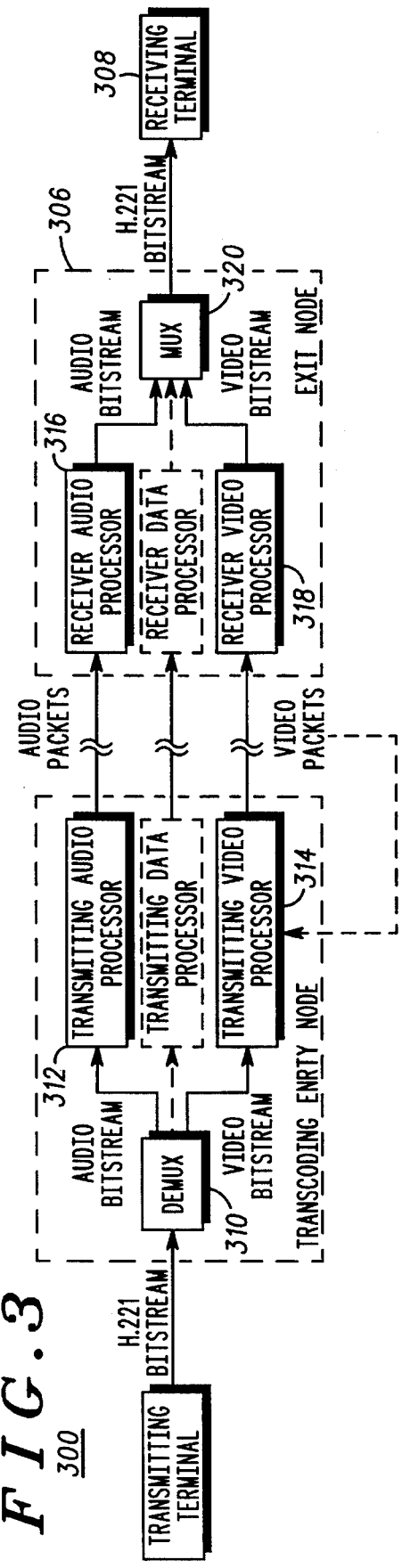

1300

```
┌─────────────────────────────────────────────────┐
│  TRANSCODING, BY A TRANSMITTING(TX) VIDEO       │
│  PROCESSOR, THE CONSTANT BIT-RATE VIDEO         │
│  BITSTREAM INTO A MODIFIED VARIABLE             │
│  BIT-RATE VIDEO BITSTREAM IN ACCORDANCE WITH    │──1402
│  A PREDETERMINED BIT SYNTEX, PACKETIZING THE    │
│  MODIFIED VARIABLE BIT-RATE VIDEO BITSTREAM     │
│  INTO VARIABLE BIT-RATE VIDEO PACKETS AND       │
│  SENDING THE VARIABLE BIT-RATE VIDEO PACKETS    │
│  OVER A CHANNEL OF AT LEAST A FIRST PACKET      │
│  NETWORK                                        │
└─────────────────────────────────────────────────┘
                        │
                        ▼
┌─────────────────────────────────────────────────┐
│  PROCESSING, BY A TRANSMITTING(TX) AUDIO        │
│  PROCESSOR, THE AUDIO BUTSTREAM IN ACCORDANCE   │
│  WITH A PREDETERMINED AUDIO CODING TECHNIQUE,   │──1404
│  PACKETIZING THE PROCESSED AUDIO BITSTREAM,     │
│  AND SENDING THE PACKETIZED PROCESSED AUDIO     │
│  BITSTREAM OVER A SECOND CHANNEL OF AT          │
│  LEAST A FIRST PACKET NETWORK                   │
└─────────────────────────────────────────────────┘
                        │
                        ▼
┌─────────────────────────────────────────────────┐
│  WHERE SELECTED, PROCESSING, BY A TRANSMITTING  │──1406
│  DATA PROCESSOR, THE DATA BITSTREAM IN          │
│  ACCORDANCE WITH A PREDETERMINED DATA           │
│  CODING TECHNIQUE                               │
└─────────────────────────────────────────────────┘
```

```
┌─────────────────────────────────────────────────┐
│  RECEIVING THE PROCESSING, BY A PLURALITY OF    │
│  RECEIVING PROCESSORS, A COMPONENT VARIABLE     │──1502
│  BIT-RATE PACKETIZED BITSTREAM TO PROVIDE A     │
│  CORRESPONDING CONSTANT BIT-RATE COMPONENT      │
│  BITSTREAM FOR THE COMPONENT                    │
└─────────────────────────────────────────────────┘
                        │
                        ▼
┌─────────────────────────────────────────────────┐
│  MULTIPLEXING, BY A MULTIPLEXER, THE CONSTANT   │
│  BIT-RATE COMPONENT BITSTREAMS AND PROVIDING    │──1504
│  THE MULTIPLEXED BITSTREAMS TO THE RECEIVING    │
│  TERMINAL                                       │
└─────────────────────────────────────────────────┘
```

DEVICE, METHOD AND SYSTEM FOR VARIABLE BIT-RATE PACKET VIDEO COMMUNICATIONS

FIELD OF THE INVENTION

This invention relates generally to packet video communications and more particularly to variable bit-rate packet video communications.

BACKGROUND

In digital video communication systems, variable bit-rate (VBR) transmission can provide constant video quality and can improve bandwidth efficiency through statistical multiplexing. These benefits can be realized using packet networks. However, most video conferencing terminals in use today are designed for operation over constant bit-rate (CBR) circuit-switched networks. As a result, no statistical gains can be obtained. Furthermore, when complex motion is encountered or during a scene change or a screen refresh, the video quality may be substantially degraded.

Asynchronous Transfer Mode (ATM) networks can statistically multiplex VBR video bitstreams with other traffic types (data, voice, image) while providing a quality-of-service according to the needs of each traffic type. It is expected that in the future videoconferencing terminals will be designed for operation over ATM networks and thus will support VBR transmission. However, CBR videoconferencing terminals are expected to remain in use.

CBR video signals can be carried over ATM networks using so-called circuit emulation. However, circuit-emulation has many of the same drawbacks of circuit-switching: it does not allow statistical multiplexing and results in variable video quality. Moreover, the overhead of packet headers further reduces the transmission efficiency.

Several video compression standards have been defined in recent years by various standards organizations. These standards specify the syntax for the bitstream transmitted by the video encoder. A decoder can reconstruct the compressed video signal from the received bitstream using its knowledge of the standard syntax.

Thus, there is a need for a system that improves the video quality and bandwidth efficiency in transporting video signals that are generated by CBR terminals.

BRIEF DESCRIPTIONS OF THE DRAWINGS

FIG. 1 is a block diagram of one embodiment of a video transcoding device in accordance with the present invention.

FIG. 2 is a block diagram of one embodiment of a packet network-based video communication system utilizing the video transcoding device of FIG. 1 in accordance with the present invention.

FIG. 3 is a block diagram of one embodiment of the VBR packet video communication system for transmission of H.320 bitstream in accordance with the present invention.

FIG. 14 is a flow chart illustrating further steps typically implemented at the transcoding entry node in accordance with the present invention.

FIG. 15 is a flow chart illustrating the steps implemented where the transcoding entry node of the present invention is an element of a communication system that further includes a transmitting terminal for generating the constant bit-rate (CBR) multimedia bitstream, an exit node for receiving the packetized bitstreams, and a receiving terminal operably coupled to the exit node, and the steps, at the exit node in accordance with the present invention.

Figure 16:

FIG. 16 is a flow chart showing the steps that may further be implemented by the plurality of receiving processors of FIG. 15.

Figure 17:
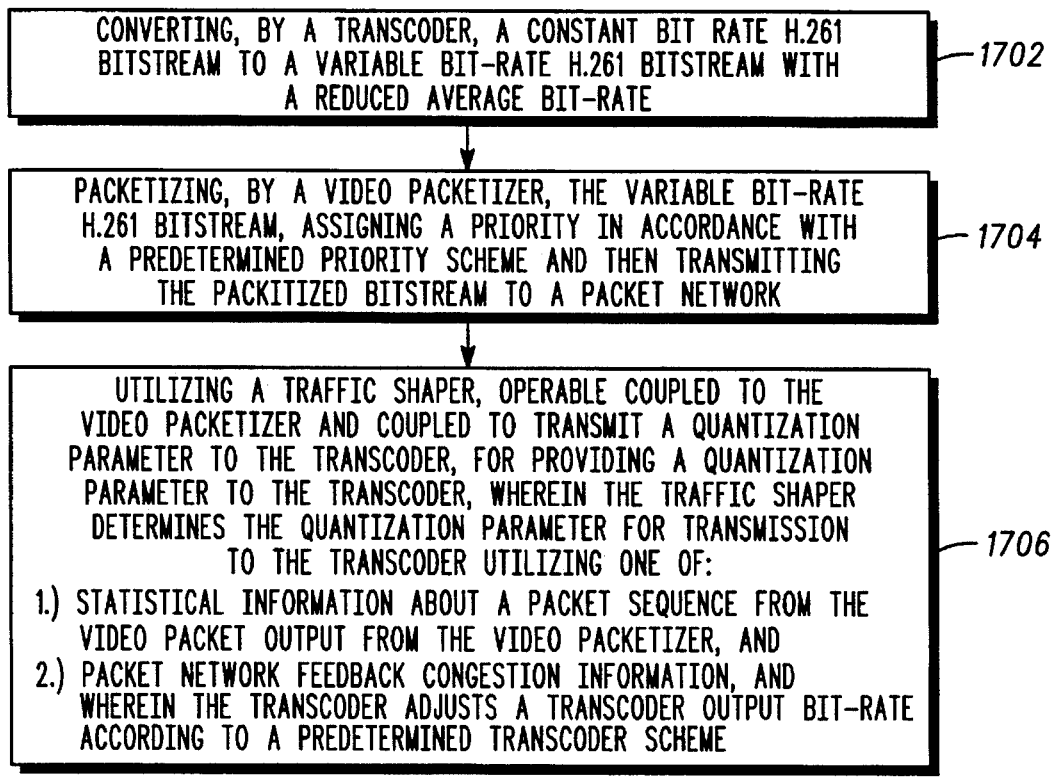

FIG. 17 is a flow chart showing the steps that may further be implemented by the transmitting video processor in accordance with the present invention.

Figure 18:
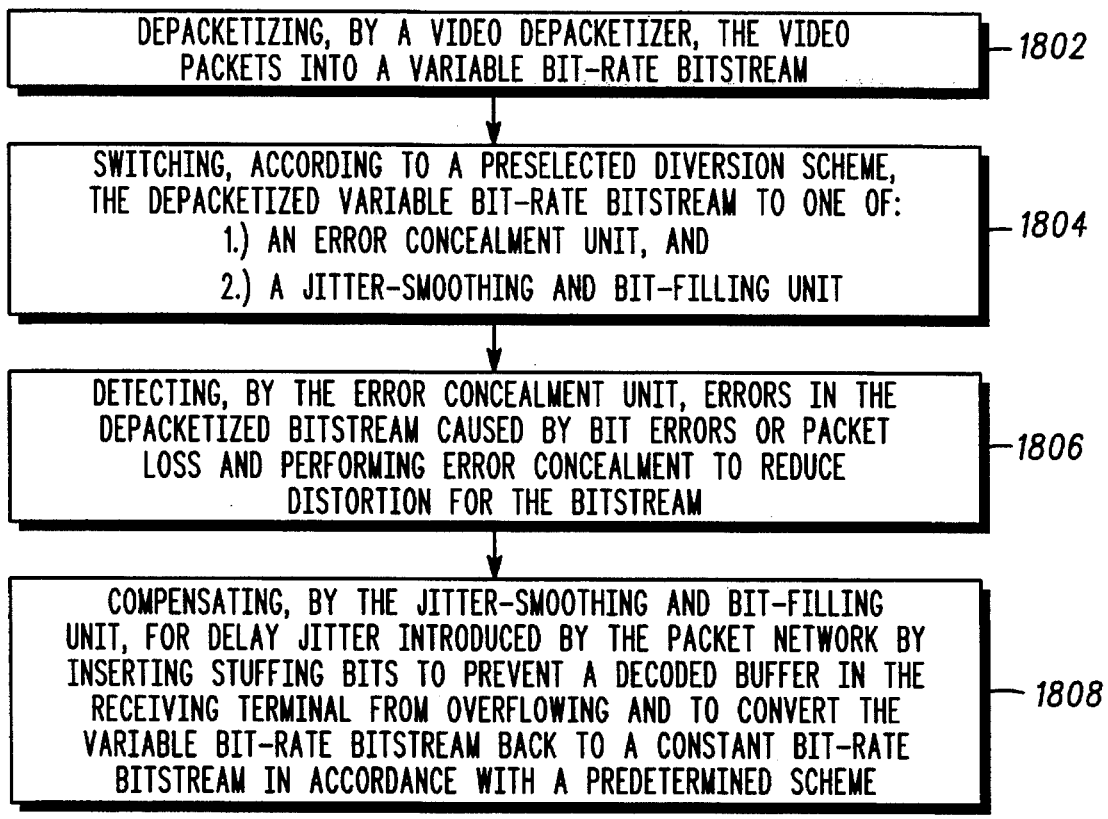

FIG. 18 is a flow chart showing the steps that may further be implemented by the receiving video processor in accordance with the present invention.

Figure 19:
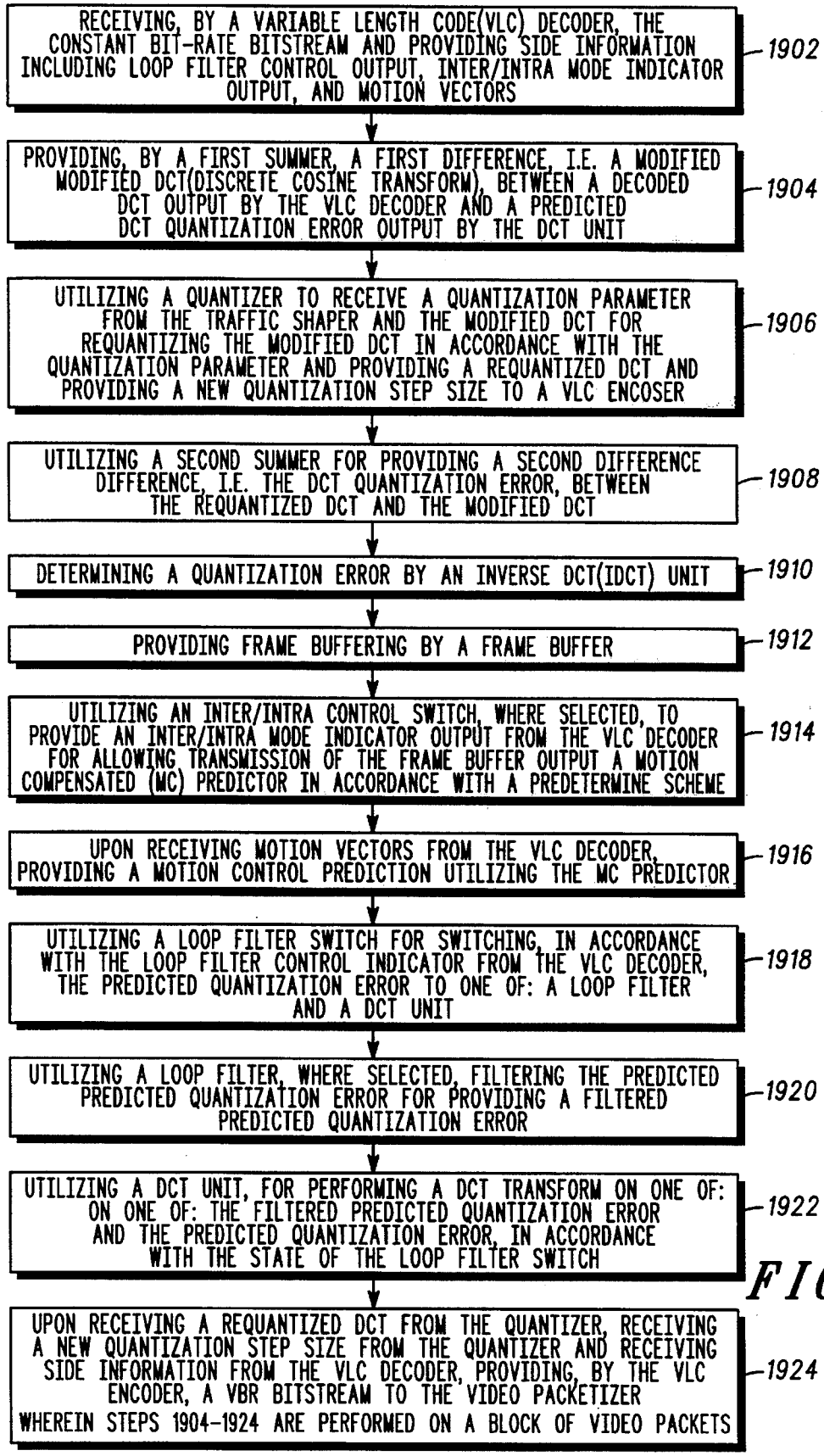

FIG. 19 is a flow chart of the steps implemented by the transcoder in accordance with the present invention.

Figure 20:
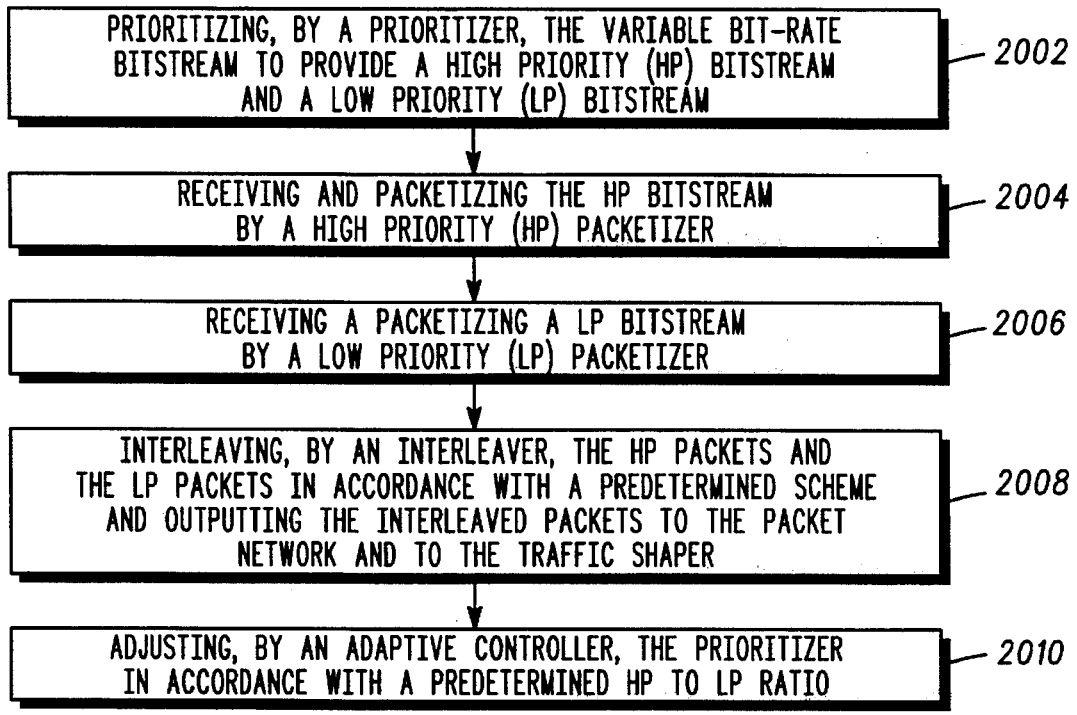

FIG. 20 is a flow chart of the steps typically implemented by the video packetizer in accordance with the present invention.

Figure 21:
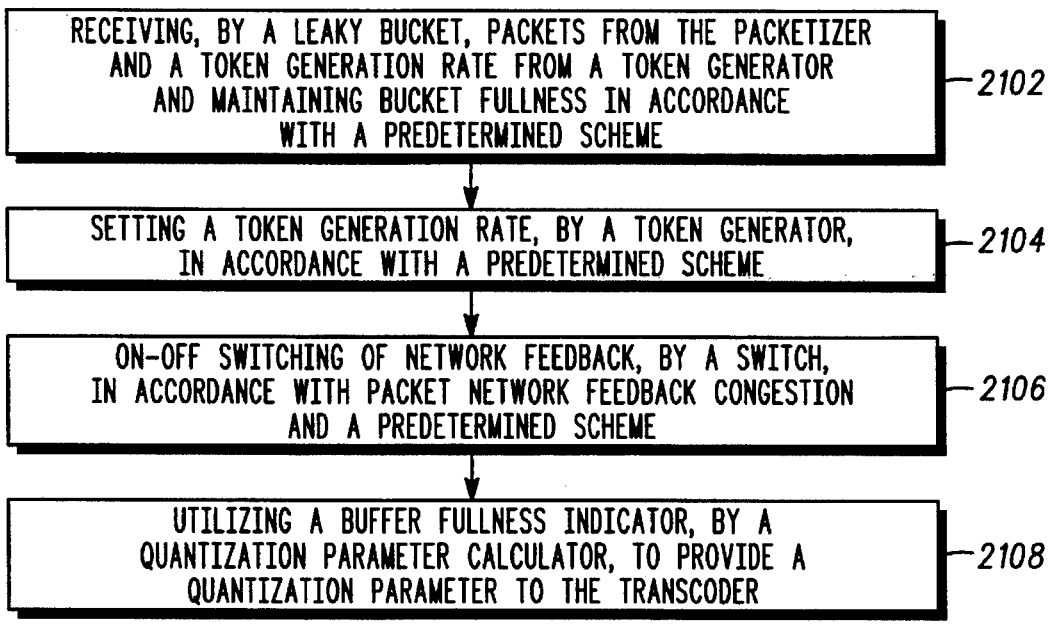

FIG. 21 is a flow chart of the steps typically implemented by the traffic shaper in accordance with the present invention.

Figure 22:
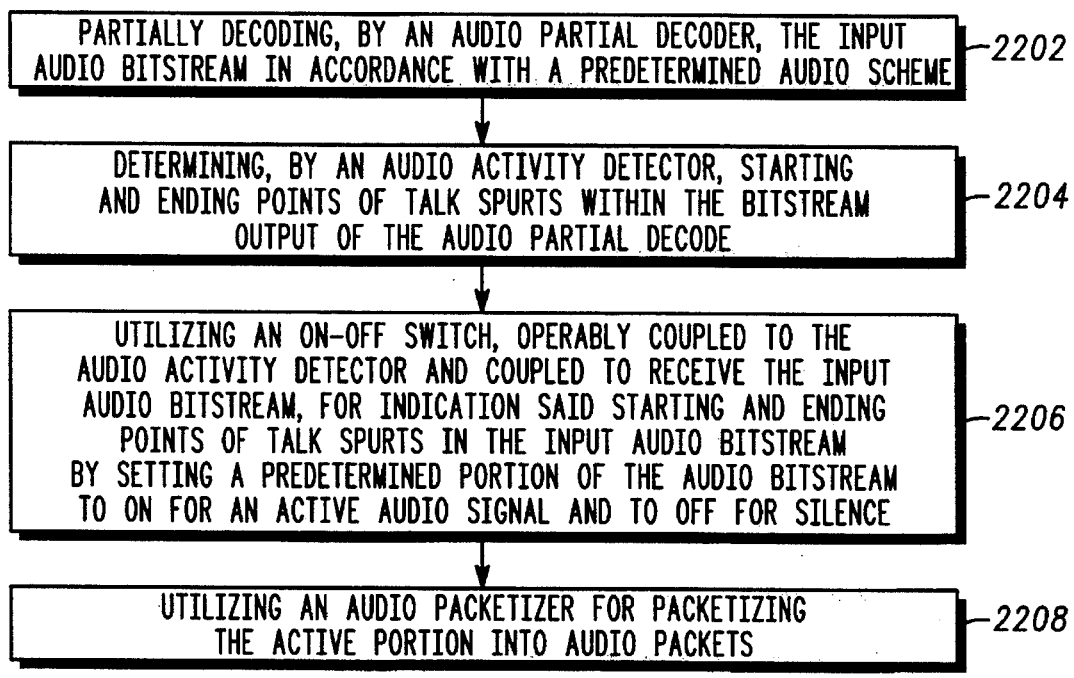

FIG. 22 is a flow chart showing the steps typically implemented by the transmitting audio processor in accordance with the present invention.

Figure 23:
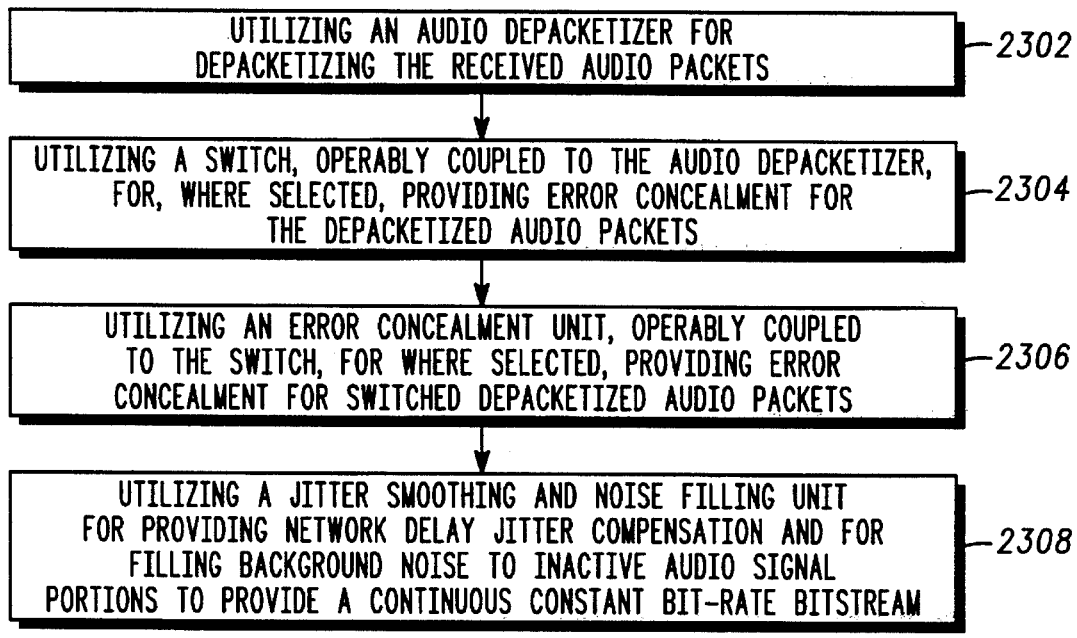

FIG. 23 is a flow chart of the steps typically implemented by the receiving audio processor in accordance with the present invention.

DESCRIPTION OF A PREFERRED EMBODIMENT

The present invention provides for transcoding a received bitstream from constant to variable bit-rate according to the bitstream syntax, typically predetermined by the receiving video terminal, and packetizing the variable bitrate bitstream into packets for efficient transport of a digital signal over a packet-switched network.

FIG. 1, numeral 100, is a block diagram of one embodiment of a video transcoding device in accordance with the present invention. The video transcoding device includes a transcoding entry node (102) in the packet network (e.g., an ATM network) that receives a constant bit-rate video bitstream, typically from a transmitting video terminal. The transcoding entry node (102) includes a constant-to-variable bit-rate transcoder (104) and a packetizer (106) that is operably coupled to the constant-to-variable bit-rate transcoder (104). The input to this device is a video bitstream coded at a CBR according to a known syntax, e.g., according to the H.261 video compression standard. This input bitstream is first transcoded by a constant-to-variable bit-rate transcoder (104) into a modified VBR bitstream, which typically has a reduced average bit-rate and substantially satisfies a bit syntax, typically predetermined by a receiving video terminal. Then the modified VBR bitstream is packetized in the packetizer (106) into video packets for transport over packet networks.

FIG. 2, numeral 200, is a block diagram of one embodiment of a video communication system utilizing the video transcoding device of FIG. 1 in accordance with the present invention. The system includes a transmitting video terminal (202), a packet network (204) having the transcoding entry node of FIG. 1 operably coupled to an exit node (206), and a receiving video terminal (212). The transcoding entry node (102) in the packet network (204) (e.g., an ATM network) receives a first video bitstream from the transmitting video terminal (202). The video terminal (202) generates this bitstream according to a known syntax (e.g., according to the H.261 video compression standard). As in FIG. 1, the transcoding entry node (102) includes the constant-to-variable bit-rate transcoder (104) and the packetizer (106), and operates as described above. The exit node (206) includes a de-packetizer (208) and a bit stuffing unit (210). The depacketizer (208) of the exit node (206) receives transmitted packets from the packetizer (106), possibly in the presence of a variable network delay, i.e., delay jitter, and cell loss, performs a depacketization function to produce a variable bitrate serial bitstream that substantially corresponds to the variable bit-rate bitstream generated by the constant-to-variable bit-rate transcoder at the entry node (102), and then utilizes the bit stuffing unit (210) to convert it into a second CBR bitstream by adding stuffing bits according to the bitstream syntax predetermined by the receiving video terminal (212). The CBR bitstream is then transmitted to the receiving video terminal (212) using a CBR communication link.

The bitstream syntax predetermined by the receiving video terminal (212) may be the same as the syntax used by the transmitting terminal. In this case, no format conversion is performed at the entry node.

The system of the present invention allows the transmission of CBR encoded videoconferencing signals over an ATM network using VBR transmission. A key aspect of the invention is its low-complexity. This is achieved by transcoding the received bitstream from constant-to-variable bit-rate according to the bitstream syntax predetermined by the receiving video terminal. The present invention greatly reduces processing in the exit node. A transcoding function is not required in the exit node.

The system of the present invention can be used to reduce the average bit-rate of the video signal without substantially degrading the video quality. For example, a video signal coded at a CBR of 100 kb/s can be transmitted at a VBR with an average bit-rate of about 50 kb/s without significant quality degradation. The system can also be used to reduce the average bit-rate significantly, at the expense of some quality degradation. For example, a video signal coded (CBR) at 300 kb/s can be transmitted at a VBR of 50 kb/s, with a quality substantially better than the same video signal coded at CBR of 50 kb/s.

The system of the present invention can be used with a traffic shaper at the entry node to ensure that the VBR bitstream generated by the transcoder satisfies certain statistical requirements. For example, using a leaky-bucket traffic shaper, the average bit-rate and the "burst size" of the video bitstream can be controlled by feeding the state of the leaky-bucket back to the transcoder so that it can adjust its output bit-rate accordingly.

The average bit-rate of the constant-to-variable bit 5 rate transcoder can be fixed a priori, or it can be adjusted at the call or cell level based on network congestion. When congestion is encountered, the average bit-rate can be reduced. This feature can be used to increase bandwidth efficiency and increase statistical gain. The bit-rate adjustment of the transcoder can be achieved through a leaky-bucket traffic shaper which sends feedback information to the transcoder based on a record of the recent bit rate as well as the network congestion level.

The system of the present invention is also designed to minimize the processing delay introduced by the network. This is achieved using an efficient packetization scheme, a traffic shaper with no buffering, and a minimum-delay jitter smoother. It may also be used as an efficient, low-delay method for transcoding between two different video compression formats.

The system of the present invention may also be used to carry audio bitstreams in addition to video. In this case, the digital audio bitstream received from the external terminal may first be decoded, at least partially, to determine whether an audio frame represents active speech or silence. Only the information that represents active speech is packetized and transmitted over the packet network. By not transmitting during silence intervals, our system further improves bandwidth efficiency through statistical gains. The audio signals can be carried using different virtual circuits, but this may not be necessary in some applications. The system of the present invention can also be utilized with CBR audio transmissions.

FIG. 3, numeral 300, is a block diagram of one embodiment of a VBR packet video communication system for transmission of the bitstream received from an H.320 terminal (302) through a packet network. H.320 is an umbrella standard which includes a family of standards covering video and audio compression, multiplexing, graphics and control signaling, was established by ITU-T (the International Telecommunications Union- Telecommunications Standardization Sector), and is known to those skilled in the art. In H.320, both video and audio signals are encoded at a CBR. This invention provides a system that efficiently converts the CBR video and audio bitstreams to corresponding VBR bitstreams with reduced average bit-rates and then transmits these bitstreams through a packet-switched network.

In the system shown in FIG. 3, a transcoding entry node (304) of a packet-switched network receives a CBR H.221 bitstream from a transmitting H.320 terminal (302). H.221 is one of the standards used in H.320 which specifies how video, audio and data are multiplexed together and is known to those skilled in the art. The received H.221 bitstream is first processed by a demultiplexer (Demux) (310) which separates the aggregate bitstream into a video bitstream and an audio bitstream. The video bitstream, coded according to the H.261 standard, is processed by the transmitting (Tx) video processor (314), which outputs VBR video packets. The audio bitstream, coded based on one of the audio coding standards supported by the H.221 standard (e.g., G.711, G.722 or G.728), is processed by a Tx audio processor (312) which outputs VBR audio packets. A data channel may also be selected. Where a data channel is selected, a data bitstream that is output by the Demux (310) is processed by a Tx data processor (313) which processes the data bitstream based on a predetermined technique and outputs VBR data packets.

At an exit node (306), the received video, audio and where selected, data, packets are processed by a receiving (Rx) video processor (318), an Rx audio processor (316), and, where selected, an Rx data processor (317), respectively, which output the CBR video, audio, and where selected, data bitstreams. These bitstreams are multiplexed at a multiplexer (Mux) (320) which produces the CBR H.221 bitstream for transmission to the receiving H.320 terminal (308).

Figure 4:
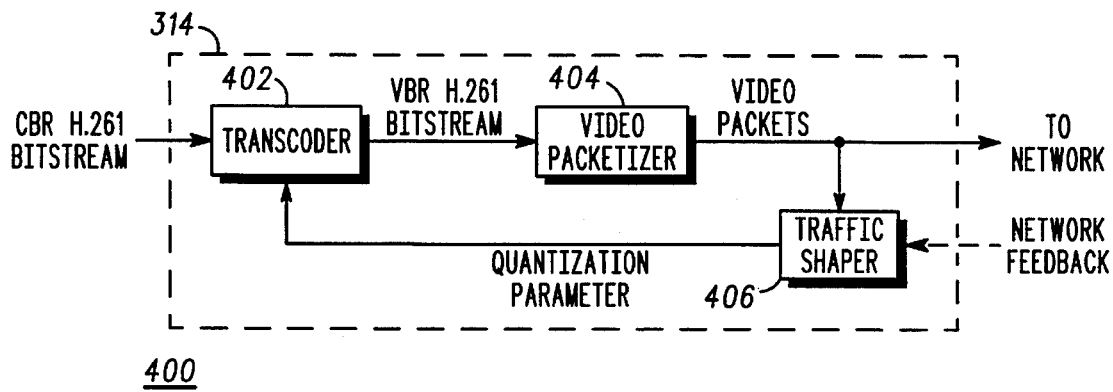
FIG. 4 is a more detailed block diagram of one embodiment of the transmitting (Tx) video processor of FIG. 3.

FIG. 4, numeral 400, shows a more detailed block diagram of one embodiment of the TX video processor (314) of FIG. 3, wherein the TX video processor (314) includes a transcoder (402), a video packetizer (404), and a traffic shaper (406). Here, the CBR H.261 video bitstream is received by the transcoder (402), which converts it to a VBR H.261 bitstream with a reduced average bit-rate. The transcoder (402) can be implemented using the techniques disclosed by Eyuboglu and Yong in patent application Ser. No. 08/179,020, entitled "Efficient Transcoding Device and Method", filed Jan. 4, 1994, which is incorporated herein by reference.

The VBR H.261 bitstream is prioritized and packetized by the video packetizer (404) into packets. Each packet is assigned either a low priority (LP) or a high priority (HP) in accordance with a predetermined priority scheme and then transmitted. In addition to transmitting the prioritized packets to the network, the video packetizer (404) is operably coupled to a traffic shaper (406) to provide feedback. The transcoder (402) is operably coupled to the traffic shaper (406). The traffic shaper (406) collects statistical information about the packet sequence and uses this information to adjust the output bit-rate of the transcoder (402) according to a predetermined transcoder scheme. The traffic shaper (406) adjusts the bit-rate by varying a quantization parameter. The transcoder (402), at predetermined intervals, checks the quantization parameter produced by the traffic shaper (406) to adjust its quantization step size. Typically, the frequency with which the transcoder (402) adjusts its quantization step size is set to once every frame, once every Group Of Blocks (GOB), or once every Macro Block (MB). The traffic shaper (406) may also be selected to be controlled according to feedback obtained from the network which indicates the level of congestion. For example, the traffic shaper (406) may lower or raise the output packet rate based on network loading.

Figure 5:
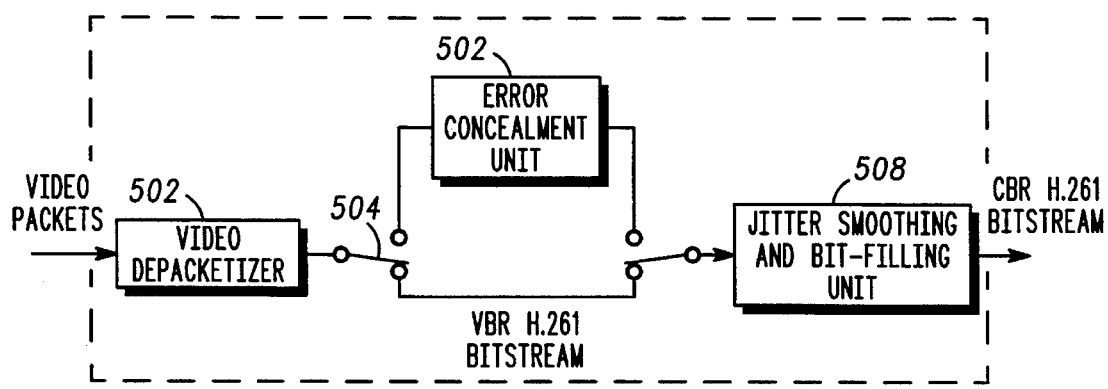
FIG. 5 is a more detailed block diagram of one embodiment of the receiving (Rx) video processor of FIG. 3.

FIG. 5, numeral 500, shows a more detailed block diagram of one embodiment of the Rx video processor (318) of FIG. 3. The Rx video processor (318) includes a video depacketizer (502), a first switch (504), an error concealment unit (506), a second switch (505) and a jitter smoothing and bit-filling unit (508). Here, video packets are first depacketized by the video depacketizer (502) into a VBR H.261 bitstream. The first switch (504) is operably coupled to the video depacketizer (502) for, diverting the depacketized H.261 bitstream to one of: the error concealment unit (506) and the jitter smoothing and bit-filling unit (508). The error concealment unit (506), where selected, detects errors in the depacketized bitstream caused by bit errors or packet loss and performs error concealment to reduce distortion to the video signal. The second switch (505), operably coupled to the error concealment unit (506) and to the first switch (504), passes one of: the "error-concealed" H.261 bitstream and the depacketized H.261 bitstream to the jitter-smoothing and bit-filling unit (508), which compensates for the delay jitter introduced by the network by inserting stuffing bits to prevent the decoder buffer in the receiving terminal from overflowing and to convert the VBR bitstream back to the CBR bitstream. The jitter-smoothing and bit-filling technique is described by Zhu and Yong in a patent application filed concurrently herewith, entitled "Minimum-Delay Jitter Smoothing Device and Method for Packet Video Communications".

Figure 6:
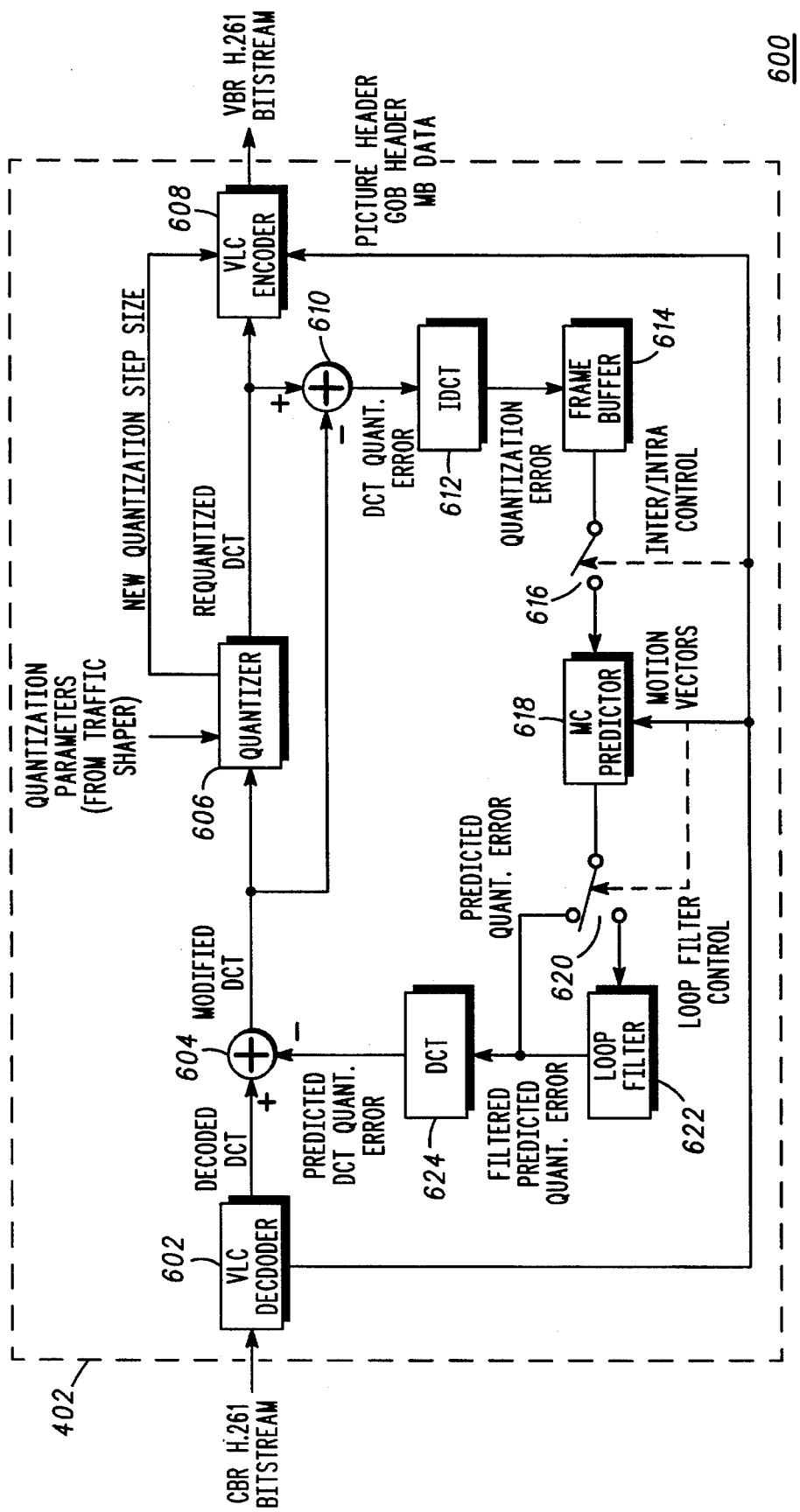
FIG. 6 is a more detailed block diagram of one embodiment of the transcoder of FIG. 4.

FIG. 6, numeral 600, shows a detailed block diagram of one embodiment of the transcoder (402) of FIG. 4, referred to herein as a "one-step transcoder". This device efficiently transcodes the CBR video bitstream into a VBR bitstream by combining "decoding and re-encoding" into a single step. The transcoder (402) includes: a variable length code (VLC) decoder (602); a first summer (604) that is operably coupled to the VLC decoder (602) and to a DCT (discrete cosine transform) unit (624) for providing a first difference, i.e., a modified DCT, between a decoded DCT output by the VLC decoder (602) and a predicted DCT quantization error output by the DCT unit (624); a quantizer (606) that is operably coupled to receive a quantization parameter from the traffic shaper (406) and to receive the modified DCT for requantizing the modified DCT in accordance with the quantization parameter to provide a requantized DCT and for providing a new quantization step size to a VLC encoder (608); a second summer (610) that is operably coupled to the quantizer (606) and to the first summer (604) for providing a second difference, i.e., the DCT quantization error, between the requantized DCT and the modified DCT; an inverse DCT (IDCT) unit (612) that is operably coupled to the second summer (610) for determining a quantization error; a frame buffer (614) that is operably coupled to the IDCT unit (612) for providing frame buffering; an Inter/Intra Control switch (616) that is operably coupled to the frame buffer (614) and coupled to receive an Inter/Intra mode indicator from the VLC decoder (602), for passing or blocking transmission of the frame buffer output to a Motion Compensated (MC) Predictor (618) in accordance with a predetermined scheme; the MC Predictor (618) that is operably coupled to the Inter/Intra switch (616) and to receive motion vectors from the VLC decoder (602), for providing a predicted quantization error; a Iccp filter switch (620) that is operably coupled to the MC Predictor (618) and coupled to receive a Iccp filter control indicator from the VLC decoder (602) for providing a predicted quantization error to one of: a Iccp filter (622) and the DCT unit (624) in accordance with a predetermined scheme; the Iccp filter (622) that is operably coupled to the Iccp filter switch (620), where the Iccp filter switch (620) is on the Iccp filter (622) side, for providing a filtered predicted quantization error; a DCT unit (624) that is operably coupled to one of: the Iccp filter (622) and the Iccp filter switch (622) where the Iccp filter switch (620) is on the DCT unit (624) side, for providing a predicted DCT quantization error; and the VLC encoder (608) that is operably coupled to receive a requantized DCT from the quantizer (606), to receive a new quantization step size from the quantizer (606) and to receive side information from the VLC decoder (602), for providing a VBR H.261 bitstream to the video packetizer (404) of FIG. 4.

Thus, as shown in FIG. 6, the input CBR H.261 bitstream is first decoded by the variable length code (VLC) decoder (602). The decoded information includes side information and the quantized DCT coefficients. Side information includes: picture header, GOB (Group of Blocks) header, and MB (MacroBlock) level information such as the Iccp filter on-off indicator, the motion vectors, the Inter/Intra mode indicator etc. The decoded motion vectors of each MB are input to the MC predictor (618) which performs a MC prediction in accordance with a predetermined scheme. The Iccp filter control indicator is used to control the Iccp filter switch (620). The Inter/Intra mode indicator is used to control the Inter/Intra switch (616). All side information is passed to the VLC encoder (608) along with the requantized DCT coefficients and the quantization step size for generating the VBR H.261 bitstream.

For each 8×8 block of DCT coefficients, one of the following two operations is performed:

1) For a DCT block that is coded in the Intra-mode, the Intra/Inter switch in FIG. 6 is open. Therefore, the output of the DCT unit (624), referred to here as the predicted DCT quantization error, is zero, and the input of the quantizer (606) is the decoded DCT coefficients.

2) For a DCT block that is coded in the Inter-mode, the Intra/Inter switch (616) in FIG. 6 is closed. Therefore, the predicted DCT quantization error may be non-zero and is produced as follows: A) a selected block of quantization error samples from the previous frame (which are stored in a frame buffer) are input to the MC predictor (618) to produce the predicted quantization error samples; B) if the loop filter switch (620) is closed, the predicted quantization error samples are filtered by the loop filter (622); otherwise the loop filter (622) is bypassed; C) the filtered predicted quantization error or the predicted quantization error (depending on the state of the loop filter switch (620)) is input to the DCT unit (624) which performs a discrete cosine transform and outputs the predicted DCT quantization error samples.

The predicted DCT quantization error samples are subtracted from the decoded DCT coefficients to produce the block of modified DCT coefficients. The modified DCT coefficients are requantized by the quantizer (606) to produce the requantized DCT coefficients. The modified DCT coefficients are then subtracted from the requantized DCT coefficients to produce the DCT quantization error samples. The DCT quantization error samples are processed by the IDCT unit (612), which performs the inverse discrete cosine transform and outputs the quantization error samples. The quantization error samples are stored in the frame buffer (614) and are used for prediction of the next frame.

The quantizer (606) in the transcoder (402) operates according to the following scheme. The minimum quantization step size called $Q_{min}$ is initialized to a preselected value and then periodically adjusted according to the quantization parameter received from the traffic shaper (406). Typically, the quantization step size is equal to the quantization parameter multiplied by two. For each MB, the quantizer compares each decoded quantization step size with $Q_{min}$. If the decoded quantization step size is less than $Q_{min}$, it is set equal to $Q_{min}$. Otherwise, it is kept unchanged. All DCT coefficients in the MB are then requantized using the new quantization step size.

Other transcoding algorithm may be used to convert the video bit stream from CBR to VBR.

Figure 7:
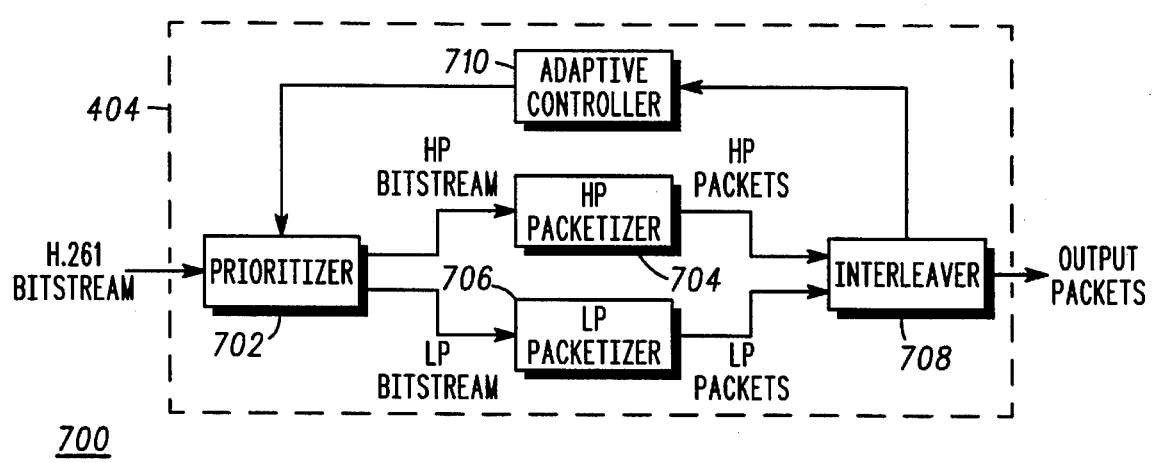
FIG. 7 is a more detailed block diagram of one embodiment of the video packetizer of FIG. 4.

FIG. 7, numeral 700, shows a detailed block diagram of one embodiment of the video packetizer (404) of FIG. 4. The video packetizer (404) includes: a prioritizer (702) that is operably coupled to receive a VBR H.261 bitstream from the constant-to-variable bit-rate transcoder (402); a high priority (HP) packetizer (704) that is operably coupled to the prioritizer (702) for packetizing a HP bitstream; a low priority (LP) packetizer (706) that is operably coupled to the prioritizer (702) for packetizing a LP bitstream; an interleaver (708) that is operably coupled to the HP packetizer (704) and to the LP packetizer (706) for interleaving the HP packets and the LP packets in accordance with a predetermined scheme and outputting the interleaved packets to the network and to the traffic shaper (406); and an adaptive controller (710) that is operably coupled to the interleaver (708) for adjusting the prioritizer (702) in accordance with a predetermined HP to LP ratio. Here, the output of the transcoder (402) is first separated by a prioritizer (702) into a high priority (HP) bitstream and a low priority (LP) bitstream. Then, the HP and LP bitstreams are respectively packetized into HP packets and LP packets by the HP packetizer (704) and the LP packetizer (706), respectively. Next, the HP and LP packets are interleaved according to a FIFO policy (i.e., the packet filled first is output first), and then sent across the network. The adaptive controller (710) computes the HP ratio, which is defined as the ratio of the number of HP packets to the total number of packets sent out during a given period, and adjusts the operation of the prioritizer (702) to insure that the actual HP ratio is close to a predetermined value. A more detailed description of the prioritization and packetization methods are given below.

Figure 8:
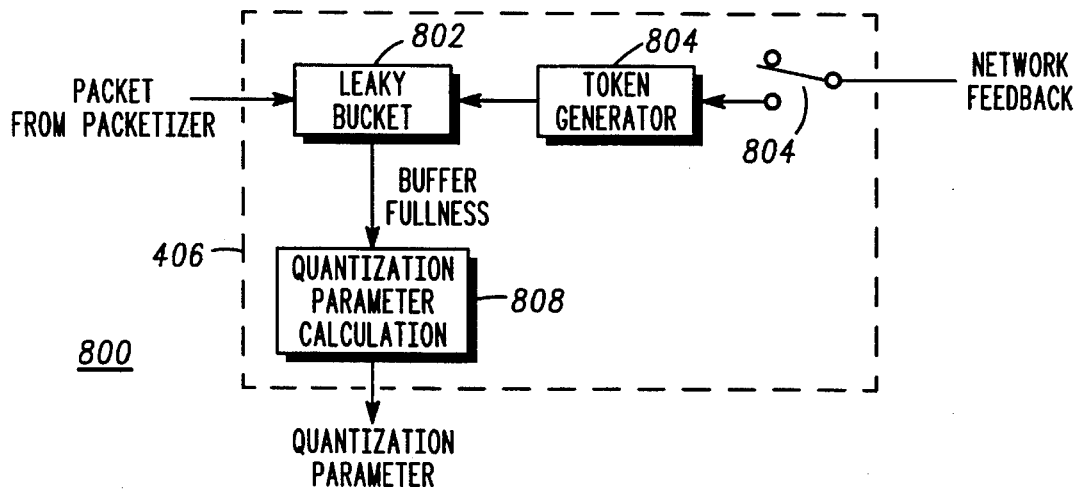
FIG. 8 is a more detailed block diagram of one embodiment of the traffic shaper of FIG. 4.

FIG. 8, numeral 800, is a detailed diagram of one embodiment of the traffic shaper (406) of FIG. 4. The traffic shaper (406) includes: a leaky bucket (802) operably coupled to receive packets from the packetizer (404) and to receive a token generation rate from a token generator (804), for maintaining bucket fullness in accordance with a predetermined scheme; a token generator (804), operably coupled to a switch (806) for setting a token generation rate in accordance with a predetermined scheme; a switch (806), operably coupled to receive network feedback, for on-off switching of network feedback in accordance with a predetermined scheme; and a quantization parameter calculator (808), operably coupled to the leaky bucket (802), for utilizing a buffer fullness indicator to provide a quantization parameter to the transcoder (402). Here, a leaky-bucket device (802) maintains a record of the fullness of an imaginary leaky bucket. Every time a packet is transmitted, the bucket fullness is incremented by the packet size and decremented at a token generation rate. The bucket size and the token generation rate control the operation of the leaky-bucket (802). The token generation rate may either be a predetermined constant, or alternatively, it may be adaptively adjusted based on network feedback. When the network is heavily congested, the token generator (804) may reduce its token rate; when the network is lightly loaded, the token generator (804) may raise its token rate. The normalized bucket fullness (equal to the bucket fullness divided by the bucket size), denoted as F, is passed to the quantization parameter (QP) calculator (808) which computes a QP using the following equation:

$$QP = aF^c + b$$

Here the parameter c is determined empirically, and $$b = QP_{min}$$

$$a = QP_{max} - QP_{min}$$

where $QP_{min}$ and $QP_{max}$ are the predetermined upper and lower bounds of QP. Typically, $QP_{max}$ is taken to be the maximum allowed value for QP defined in the video bitstream syntax and $QP_{min}$ can be a fixed value or can be adaptively adjusted based on the packet transmission rate.

Figure 9:
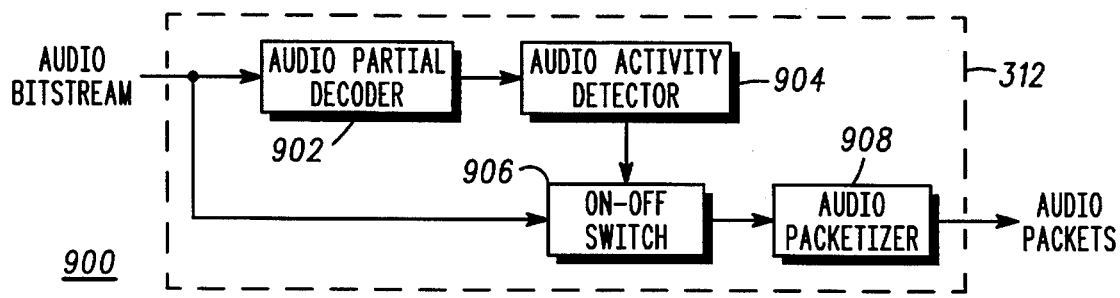
FIG. 9 is a more detailed block diagram of one embodiment of the transmitting (Tx) audio processor of FIG. 3.

FIG. 9, numeral 900, is a detailed block diagram of one embodiment of the Tx audio processor (312) of FIG. 3. The Tx audio processor (312) includes: an audio partial decoder (902), operably coupled to receive an input audio bitstream; an audio activity detector (904), operably coupled to the audio partial decoder (902), for determining starting and ending points of talk spurts; an on-off switch (906), operably coupled to the audio activity detector (904) and to receive the input audio bitstream, for setting to "on" for an active audio signal and to "off" for silence; and an audio packetizer (908), operably coupled to the on-off switch (906), for packetizing the active portion into audio packets. Here, the audio bitstream is first processed by an audio partial decoder (902) which decodes the bitstream at least partially such that the active portions of the audio signal can be distinguished from silence. For example, for audio signals coded according to G.722, it may be sufficient to decode only the lower subband. For G.728, the post-filtering operation is unnecessary to perform audio activity detection. The partially decoded audio signal is then used by the audio activity detector (904) to find the starting and ending points of each talk spurt. The on-off switch (906) is set to "on" when the input signal represents an active audio signal and is set to "off" when the input signal represents silence. The active portion of the audio bitstream is then packetized and prioritized by the audio packetizer (908) which outputs the audio packets.

Figure 10:
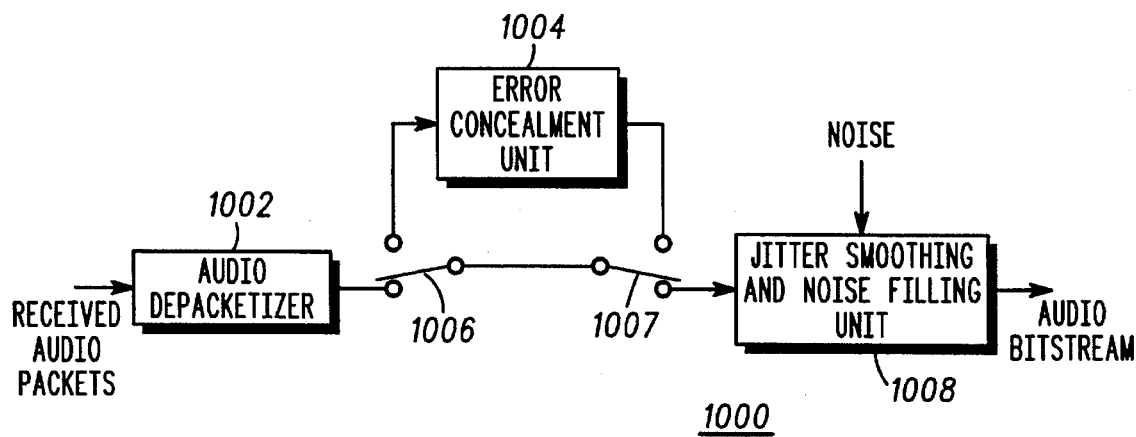
FIG. 10 is a more detailed block diagram of one embodiment of the receiving (Rx) audio processor of FIG. 3.

FIG. 10, numeral 1000, shows the detailed block diagram of the Rx audio processor (316) of FIG. 3. The Rx audio processor (316) includes: an audio depacketizer (1002), operably coupled to receive audio packets, for depacketizing the received audio packets; a first switch (1006), operably coupled to the audio depacketizer (1002), for switching the depacketized audio signal to one of: the error concealment unit (1004) and the jitter smoothing & noise filling unit (1008); an error concealment unit (1004), where selected, operably coupled to the first switch (1006), to receive the depacketized audio signal, for providing an error concealed audio signal for the depacketized audio packets; a second switch (1007), selectably operably coupled to one of: the error concealment unit (1004) and the first switch (1006) in accordance with a predetermined scheme, for passing one of: the error concealed audio signal and the depacketized audio signal; and a jitter smoothing and noise filling unit (1008), operably coupled to the second switch (1007) and to a predetermined noise source, for receiving one of: where the first switch (1006) is operably coupled to the error concealment unit (1004) and the error concealment unit (1004) is operably coupled to the second switch (1007), the error concealed audio signal, and where the first switch (1006) is operably coupled to the jitter smoothing & noise filling unit (1008) by means of the second switch (1007), the depacketized audio signal, for providing network delay jitter compensation and for filling background noise to inactive audio signal portions to provide a continuous CBR bitstream; Thus, the input audio packets are first depacketized, and then, where selected, processed by the error concealment unit (1004) which performs error concealment for protection against bit errors or packet loss. Finally, the audio bitstream is passed to the jitter-smoothing and noise-filling unit (1008) which compensates for the network delay jitter and fills background noise to inactive portions of the audio signal to provide a continuous playout of a CBR audio bitstream.

The basic principle used in prioritizing the video bitstream is to place perceptually more important information bits in the HP packets, and the less important information bits in the LP packets, and rely on the network to carry the HP packets more reliably. The prioritizer shown in FIG. 7 sequentially (according to the order in which the codewords are sent in the bitstream) places the following codewords into the HP bitstream:

1) all codes in picture headers (PSC, TR, PTYPE, PEI, PSPARE),
2) all codes in GOB headers (GBSC, GN, GQUANT, GEI, GSPARE),
3) all MB level codes (MBA, MTYPE, MQUANT, MVD, CBP, MBA STUFFING), and
4) the following coded DCT coefficients in each non-zero block:
   A) a run-length code for Intra-DC,
   B) run-length codes for the first "PBP" non-zero DCT coefficients,
   C) an EOB (end of block) code if the number of non-zero DCT coefficients is less than "PBP", where PBP, representing Priority Breaking Point, is an integer number specifying the number of coded non-zero DCT coefficients, excluding Intra-DC, to be placed in the HP bitstream.

The LP bitstream contains:

1) Picture Start Code (PSC) and Temporal Reference (TR), and
   the following coded DCT coefficients:
   A) all remaining run-length codes in each block which are not in the HP bitstream, and
   B) an EOB code if it is not included in the corresponding block of an HP bitstream.

In ATM, each packet consists of an ATM packet header, an additional one or two bytes for ATM adaptation layer or AAL, and the payload. The following steps are used to packetize the HP and LP bitstreams into the payload portion of each packet:

1) For each new video frame, a new packet is started for packing bits of each priority.
2) The first bit of each packet payload is used to indicate the end of a video frame. For each priority, when a packet is the last packet of a video frame, this bit is set to one, otherwise, it is set to zero. If the last packet is only partially full, zero bits are added at the end to maintain a fixed packet length.
3) If a packet is the first HP packet in a video frame, the following codewords are included in the beginning of the packet: all codewords in the picture header (PSC, TR, PTYPE, PEI, PSPARE), a codeword for the PBP for Intra-coded blocks (PBP—intra) and a codeword for the PBP for Inter-coded blocks (PBP—inter). The remainder of the packet is filled with the bits of the HP bitstream that follow.
4) If a packet is the first LP packet in a video frame, the following codewords are included in the beginning of the packet: PSC, TR. The remainder of the packet is filled with the bits of the LP bitstream that follow.
5) If a packet is neither the first LP packet nor the first HP packet, it is serially filled with bits from the corresponding bitstream.

6) If a GOB does not contain any MB coded data, no GOB header is sent.

The adaptive controller (710) uses backward prediction to predict the HP ratio of the current frame as follows. An Intra-coded frame is defined as a frame in which a majority of the MBs are coded in Intra-mode, and an Inter-coded frame is defined as a frame in which a majority of MBs are coded in Inter-mode. Where x(n), y(n) and z(n) are defined as the actual HP ratio, the predicted HP ratio for Inter-coded frame and the predicted HP ratio for Intra-coded frame at frame n, y(n) is computed as:

$$y(n) = \alpha y(n-1) + (1-\alpha) x(n-1)$$

The quantity z(n) is computed as:

$$z(n) = \alpha y(n) + (1-\alpha) x(n_a)$$

where $x(n_a)$ represents the HP ratio of the most recent Intraframe.

At the beginning of each frame, y(n) and z(n) are computed as given above. The quantities y(n) and z(n) are respectively compared with their corresponding thresholds. If y(n) is greater than its upper threshold, PBP—inter is decreased, preferably by one; if y(n) is less than its lower threshold, PBP—inter is increased, preferably by one; if y(n) is within its upper and lower thresholds, PBP—inter is kept unchanged. The same procedure is used to update PBP—intra, but based on z(n). Furthermore, both PBP—inter and PBP—intra should be kept within preselected ranges.

Figure 11:
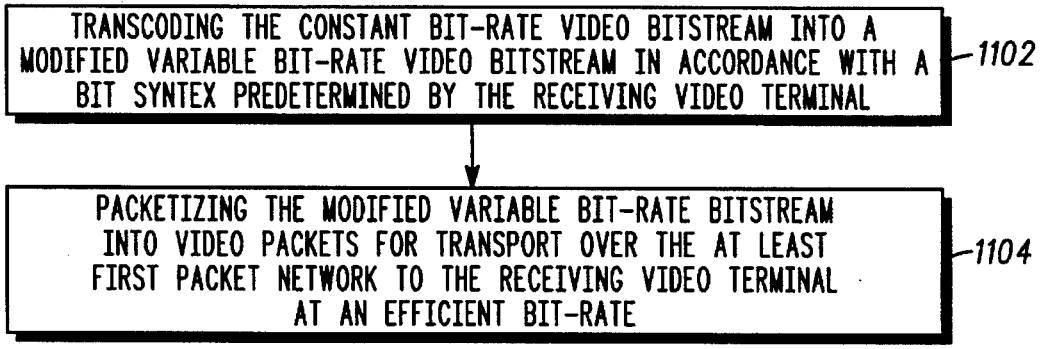
FIG. 11 is a flow chart setting forth the steps of a method in a packet network-based video transcoding system for transmitting a received constant bit-rate video bitstream at a variable bit-rate over a channel of at least a first packet network to a receiving video terminal in accordance with the present invention.

FIG. 11, numeral 1100, is a flow chart setting forth the steps of a method in a packet network-based video transcoding system for transmitting a received CBR video bitstream at a VBR over a channel of at least a first packet network to a receiving video terminal in accordance with the present invention, said method comprising the steps of: A) transcoding the CBR video bitstream into a modified VBR video bitstream in accordance with a bit syntax predetermined by the receiving video terminal (1102), and B) packetizing the modified VBR bitstream into video packets for transport over the at least first packet network to the receiving video terminal at an efficient bit-rate (1104). The CBR video bitstream may be selected to be coded according to a H.261 video compression standard. Typically, the packet network is an ATM (asynchronous transfer mode) network.

Figure 12:
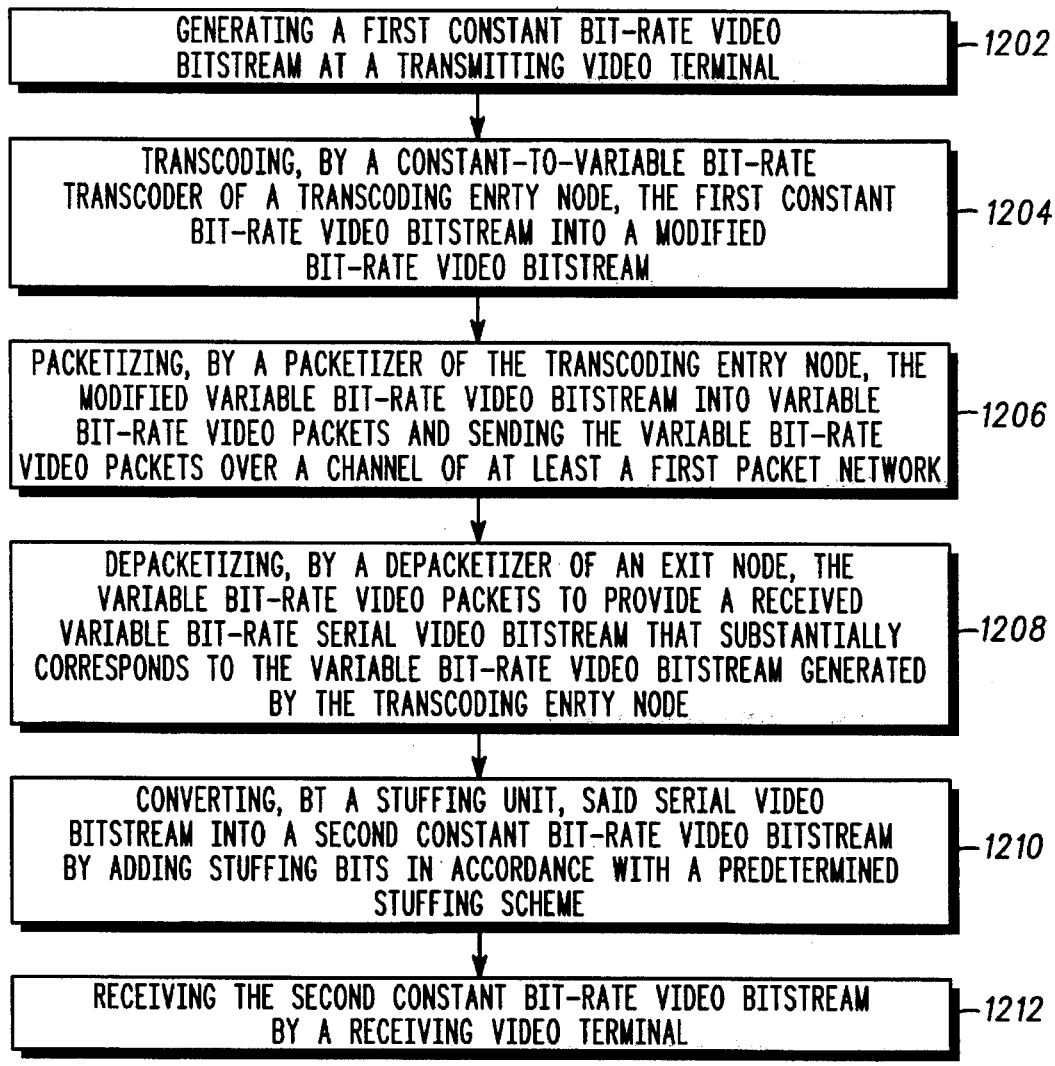
FIG. 12 is a flow chart setting forth the steps of a method in a packet network-based video communication system for utilizing conversion of a constant bit-rate video bitstream to a variable bit-rate video bitstream for efficient video bitstream processing in accordance with the present invention.

FIG. 12, numeral 1200, is a flow chart setting forth the steps of a method in a packet network-based video communication system for utilizing conversion of a CBR video bitstream to a VBR video bitstream for efficient video bitstream processing in accordance with the present invention, where the steps are: A) generating a first CBR video bitstream at a transmitting video terminal (1202), B) transcoding, by a constant-to-variable bit-rate transcoder of a transcoding entry node, the first CBR video bitstream into a modified VBR video bitstream (1204), C) packetizing, by a packetizer of the transcoding entry node, the modified VBR video bitstream into video packets and sending the video packets over a channel of at least a first packet network (1206), D) depacketizing, by a depacketizer of an exit node, the video packets to provide a received VBR serial video bitstream that substantially corresponds to the VBR video bitstream generated by the transcoding entry node (1208), D) converting, by a bit stuffing unit, said serial video bitstream into a second CBR video bitstream by adding stuffing bits in accordance with a predetermined stuffing scheme (1210), and D) receiving the second CBR video bitstream by a receiving video terminal (1212). The CBR video bitstream may be selected to be coded in accordance with H.261 video compression standard. The predetermined stuffing scheme typically provides for adding stuffing bits in accordance with a bit syntax in accordance with a H.261 video compression standard. In addition, the packet network is typically an ATM network.

Figure 13:
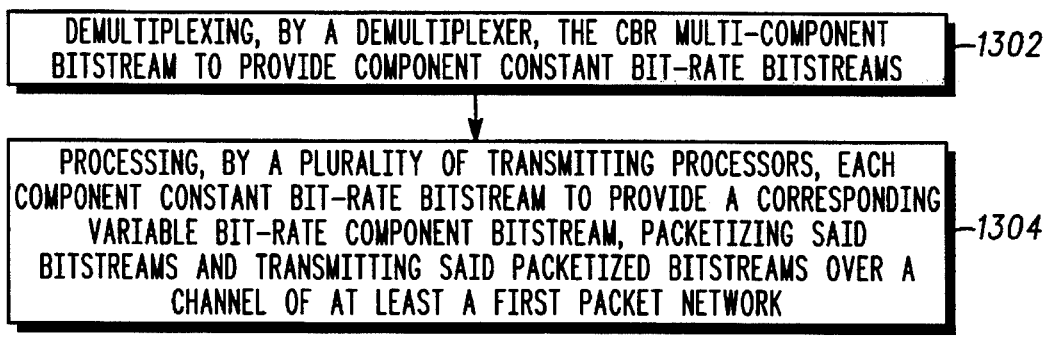
FIG. 13 is a flow chart showing the steps for a method in a packet network-based transcoding entry node for a communication system for utilizing conversion of a constant bit-rate (CBR) multimedia bitstream to a corresponding variable bit-rate multimedia bitstream for efficient bitstream processing in accordance with the present invention.

FIG. 13, numeral 1300, is a flow chart showing the steps for a method in a packet network-based transcoding entry node for a communication system for utilizing conversion of a CBR multimedia bitstream to a corresponding VBR multimedia bitstream for efficient transmission of bitstream in accordance with the present invention, the steps being: A) demultiplexing, by a demultiplexer, the CBR multimedia bitstream to provide component CBR bitstreams (1302), and B) processing, by a plurality of transmitting processors, each component CBR bitstream to provide a corresponding VBR component bitstream, packetizing said bitstreams and transmitting said packetized bitstreams over a channel of at least a first packet network (1304). The CBR multimedia bitstream typically includes CBR video and audio bitstreams and, where selected, a CBR data bitstream.

FIG. 14, numeral 1400, is a flow chart illustrating further steps typically implemented at the transcoding entry node in accordance with the present invention, including the steps of: A) transcoding, by a transmitting (Tx) video processor, the CBR video bitstream into a modified VBR video bitstream in accordance with a predetermined bit syntax, packetizing the modified VBR video bitstream into video packets and sending the video packets over a channel of at least a first packet network (1402), B) processing, by a transmitting (Tx) audio processor, the CBR audio bitstream into a VBR audio bitstream in accordance with a predetermined audio processing technique, packetizing the processed audio bitstream, and sending the packetized processed audio bitstream over a second channel of at least a first packet network (1404), and C) where selected, processing, by a transmitting data processor, the CBR data bitstream in accordance with a predetermined data processing technique (1406) into a VBR data bitstream and packetizing and sending it over a third channel of at least a first packet network. The predetermined bit syntax is typically a bit syntax predetermined by a receiving terminal.

FIG. 15, numeral 1500, is a flow chart illustrating the steps implemented where the transcoding entry node of the present invention is an element of a communication system that further includes a transmitting terminal for generating the CBR multimedia bitstream, an exit node for receiving the packetized bitstreams, and a receiving terminal operably coupled to the exit node, and the steps, at the exit node in accordance with the present invention, the further steps including: A) receiving and processing, by a plurality of receiving processors, each component VBR packetized bitstream to provide a corresponding CBR component bitstream (1502), and B) multiplexing, by a multiplexer, the CBR component bitstreams and providing the multiplexed bitstream to the receiving terminal (1504). The component VBR packetized bitstreams typically include a VBR video packetized bitstream, a VBR audio packetized bitstream, and, where selected, a VBR data packetized bitstream.

FIG. 16, numeral 1600, is a flow chart showing the steps that may further be implemented by the plurality of receiving processors of FIG. 15, i.e., the steps of: A) receiving the VBR video packetized bitstream by a receiving (RX) video processor and processing the VBR video packetized bitstream to provide a CBR video bitstream ((1602), B) receiving, by a receiving (Rx) audio processor, the VBR audio packetized bitstream and converting the VBR audio packetized bitstream to a CBR audio bitstream, C) where selected, receiving, by a receiving (RX) data processor, the VBR data packetized bitstream and processing the VBR data packetized bitstream to provide a CBR data bitstream in accordance with a predetermined technique (1606).

In the method of FIG. 15, the multimedia variable bitrate packetized bitstream typically includes VBR video and audio bitstreams and, where selected, a VBR data bitstream. In addition, the transmitting terminal and the receiving terminal of FIG. 15 may be selected to utilize a CBR transmission in accordance with an H.320 standard. The video bitstream component may be selected to include a video bitstream coded at a CBR according to an H.261 video compression standard. Generally, the packet network is an ATM network.

FIG. 17, numeral 1700, is a flow chart showing the steps that may further be implemented by the transmitting video processor in accordance with the present invention, i.e., the steps of: A) converting, by a transcoder, a CBR H.261 bitstream to a VBR H.261 bitstream with a reduced average bit-rate (1702), B) packetizing, by a video packetizer, the VBR H.261 bitstream, assigning a priority in accordance with a predetermined prioritization scheme and then transmitting the packetized bitstream to a packet network (1704), and C) utilizing a traffic shaper, operably coupled to the video packetizer and coupled to transmit a quantization parameter to the transcoder, for providing a quantization parameter to the transcoder (1706), wherein the traffic shaper determines the quantization parameter for transmission to the transcoder utilizing one of: 1) statistical information about a packet sequence from the video packet output from the video packetizer, and 2) packet network feedback congestion information, and wherein the transcoder adjusts a transcoder output bit-rate according to a predetermined transcoder scheme.

FIG. 18, numeral 1800, is a flow chart showing the steps that may further be implemented by the receiving video processor in accordance with the present invention, i.e., the steps of: A) depacketizing, by a video depacketizer, the video packets into a VBR bitstream (1802), B) switching, by a first switch, according to a preselected diversion scheme, the depacketized variable bit-rate bitstream (1804) to one of: 1) an error concealment unit, and 2) a jitter-smoothing and bit-filling unit, C) where selected, detecting, by the error concealment unit, errors in the depacketized bitstream caused by bit errors or packet loss and performing error concealment to reduce distortion for the bitstream (1806), and D) compensating, by the jitter-smoothing and bit-filling unit, for delay jitter introduced by the packet network by inserting stuffing bits to prevent a decoder buffer in the receiving terminal from overflowing and to convert the VBR bitstream back to a CBR bitstream in accordance with a predetermined scheme (1808).

FIG. 19, numeral 1900, is a flow chart of the steps implemented by the transcoder in accordance with the present invention, i.e., the steps of: A) receiving, by a variable length code (VLC) decoder, the CBR bitstream and providing side information including loop filter control output, Inter/Intra mode control indicator, and motion vectors (1902), B) providing, by a first summer, a first difference, i.e., a modified DCT (discrete cosine transform), between a decoded DCT output by the VLC decoder and a predicted DCT quantization error output by the DCT unit (1904), C) utilizing a quantizer to receive a quantization parameter from the traffic shaper and the modified DCT for requantizing the modified DCT in accordance with the quantization parameter and providing a requantized DCT and providing a new quantization step size to a VLC encoder (1906), D) utilizing a second summer for providing a second difference, i.e., the DCT quantization error, between the requantized DCT and the modified DCT (1908), E) determining a quantization error by an inverse DCT (IDCT) unit (1910), F) providing frame buffering by a frame buffer (1912), G) utilizing an Inter/Intra control switch, in accordance with the inter/intra mode control indicator, to send or not send the buffered quantization error to the MC predictor (1914), H) utilizing the MC predictor for performing MC prediction based on the buffered quantization error for providing a predicted quantization error (1916), I) utilizing a loop filter switch for switching, in accordance with the loop filter control indicator from the VLC decoder, the predicted quantization error to one of: a loop filter and a DCT unit (1918), J) utilizing a loop filter, where selected, filtering the predicted quantization error for providing a filtered predicted quantization error (1920), K) utilizing a DCT unit, for performing a DCT transform on one of: the filtered predicted quantization error and the predicted quantization error, in accordance with the state of the loop filter switch (1922), and L) upon receiving a requantized DCT from the quantizer, receiving a new quantization step size from the quantizer and receiving side information from the VLC decoder, providing, by the VLC encoder, a VBR bitstream to the video packetizer (1924), wherein steps B-K are performed on a block of video data.

FIG. 20, numeral 2000, is a flow chart of the steps typically implemented by the video packetizer in accordance with the present invention, i.e., the steps of: A) prioritizing, by a prioritizer, the VBR bitstream to provide a high priority (HP) bitstream and a low priority (LP) bitstream (2002), B) packetizing the HP bitstream by a high priority (HP) packetizer (2004), C) packetizing a LP bitstream by a low priority (LP) packetizer (2006), D) interleaving, by an interleaver, the HP packets and the LP packets in accordance with a predetermined scheme and outputting the interleaved packets to the packet network and to the traffic shaper (2008), and E) adjusting, by an adaptive controller, the prioritizer in accordance with a predetermined HP to LP ratio (2010).

FIG. 21, numeral 2100, is a flow chart of the steps typically implemented by the traffic shaper in accordance with the present invention, i.e., the steps of: A) receiving, by a leaky bucket, packets from the packetizer and a token generation rate from a token generator and maintaining bucket fullness in accordance with a predetermined scheme (2102), wherein a token generation rate is set by a token generator, in accordance with a predetermined scheme ((2104), C) where selected, receiving network feedback, by a switch, to adjust the packet generation rate in accordance with packet network feedback congestion information (2106), and D) utilizing a leaky bucket fullness indicator, by a quantization parameter calculator, to provide a quantization parameter to the transcoder (2108).

FIG. 22, numeral 2200, is a flow chart showing the steps typically implemented by the transmitting audio processor in accordance with the present invention, i.e., the steps of: A) partially decoding, by an audio partial decoder, the input audio bitstream in accordance with a predetermined audio scheme (2202), B) determining, by an audio activity detector, starting and ending points of talk spurts within the bitstream from the audio partial decode (2204), C) utilizing an on-off switch, operably coupled to the audio activity detector and coupled to receive the input audio bitstream, for indicating said starting and ending points of talk spurts in the input audio bitstream by allowing the audio bitstream to pass for the active portion of the said audio signal and not to pass for silence portion of the said audio signal (2206), and D)

utilizing an audio packetizer for packetizing the active portion of the into audio packets (2208).

FIG. 23, numeral 2300, is a flow chart of the steps typically implemented by the receiving audio processor in accordance with the present invention, i.e., the steps of: A) utilizing an audio depacketizer for depacketizing the received audio packets (2302), B) utilizing a switch, operably coupled to the audio depacketizer, for switching the depacketized audio signal to one of: an error concealment unit and a jitter smoothing and noise filling unit (2304), C) where selected, utilizing an error concealment unit, operably coupled to the switch, for providing error concealment to the depacketized audio bitstream (2306), and D) utilizing a jitter smoothing and noise filling unit for providing network delay jitter compensation and for filling background noise to inactive audio signal portions to provide a continuous CBR bitstream (2308).

Although embodiments of the present invention are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A transcoding device at an entry node in a packet-based communication system for utilizing conversion of a constant bit-rate (CBR) multimedia bitstream to a corresponding variable bit-rate multimedia bitstream for efficient transmission of the bitstream, comprising:

A) a demultiplexer, operably coupled to receive a CBR multimedia bitstream, for demultiplexing said bitstream to provide constant bit-rate bitstreams that correspond to component media in the multimedia bitstream, B) a plurality of transmitting processors, operably coupled to the demultiplexer, each for processing a component constant bit-rate bitstream to provide a corresponding variable bit-rate component bitstream, packetizing said bitstream and transmitting said packetized bitstream over a packet network, wherein the constant bit-rate multimedia bitstream includes constant bit-rate video and audio bitstreams and, where selected, a constant bit-rate data bitstream.

2. The transcoding device of claim 1 wherein the plurality of transmitting processors includes:

A) a transmitting (Tx) video processor, operably coupled to receive the constant bit-rate video bitstream, for transcoding the constant bit-rate video bitstream into a modified variable bit-rate video bitstream in accordance with a predetermined bit syntax, packetizing the modified variable bit-rate video bitstream into variable bit-rate video packets and sending the variable bit-rate video packets over a first channel of a packet network, B) a transmitting (Tx) audio processor, operably coupled to receive the constant bit-rate audio bitstream, for transcoding the audio bitstream into a variable bit-rate audio bitstream in accordance with a predetermined audio coding technique, packetizing the processed audio bitstream, and sending a packetized audio bitstream over a second channel of at least a first packet network, and C) where selected, a transmitting data processor, operably coupled to receive the constant bit-rate data bitstream, for processing the data bitstream in accordance with a predetermined data coding technique.

3. The transcoding device of claim 2 wherein the predetermined bit syntax is a bit syntax predetermined by a receiving terminal.

4. The transcoding device of claim 2 wherein the predetermined audio coding technique is a technique used for processing the bitstreams coded using one of audio coding standards supported in the H.320 standard.

5. The transcoding device of claim 1 wherein the packet network is an ATM network.

6. A transcoding device at an entry node in a packet-based communication system for utilizing conversion of a constant bit-rate (CBR) multimedia bitstream to a corresponding variable bit-rate multimedia bitstream for efficient transmission of the bitstream, comprising:

A) a demultiplexer, operably coupled to receive a CBR multimedia bitstream, for demultiplexing said bitstream to provide constant bit-rate bitstreams that correspond to component media in the multimedia bitstream, B) a plurality of transmitting processors, operably coupled to the demultiplexer, each for processing a component constant bit-rate bitstream to provide a corresponding variable bit-rate component bitstream, packetizing said bitstream and transmitting said packetized bitstream over a packet network, wherein said entry node is an element of a communication system that further includes a transmitting terminal for generating the constant bit-rate (CBR) multimedia bitstream, an exit node for receiving the packetized bitstreams, and a receiving terminal operably coupled to the exit node, wherein the exit node comprises:

C) a plurality of receiving processors, each for receiving and processing a component variable bit-rate packetized bitstream to provide a corresponding constant bit-rate component bitstream, and D) a multiplexer, operably coupled to the plurality of receiving processors, for multiplexing the constant bit-rate component bitstreams and providing the multiplexed bitstream to the receiving terminal, wherein the component variable bit-rate packetized bitstreams include a variable bitrate video packetized bitstream, a variable bit-rate audio packetized bitstream, and, where selected, a variable bit-rate data packetized bitstream.

7. The transcoding device of claim 6 wherein the plurality of receiving processors includes:

A) a receiving (Rx) video processor, operably coupled to receive the variable bit-rate video packetized bitstream, for processing the variable bit-rate video packetized bitstream to provide a constant bit-rate video bitstream, B) a receiving (Rx) audio processor, operably coupled to receive the variable bit-rate audio packetized bitstream, for processing the variable bit-rate packetized audio bitstream to provide a constant bit-rate audio bitstream, and C) where selected, a receiving (RX) data processor, operably coupled to receive the variable bit-rate data packetized bitstream, for processing the variable bit-rate data packetized bitstream to provide a constant bit-rate data stream.

8. The transcoding device of claim 7 wherein the receiving video processor comprises:

A) a video depacketizer, operably coupled to receive video packets, for depacketizing the video packets into a variable bit-rate bitstream, B) a first switch, operably coupled to the video depacketizer, for, according to a preselected diversion scheme, directing the depacketized variable bit-rate bitstream to one of:
1) an error concealment unit, and
2) a jitter-smoothing and bit-filling unit, C) the error concealment unit, operably coupled to the first switch, for detecting errors in the depacketized bitstream caused by bit errors or packet loss and performing error concealment to reduce distortion to the bitstream, D) a second switch, selectably operably coupled to one of: the error concealment unit and the first switch in accordance with a predetermined scheme, for passing one of: the error-concealed video bitstream and the depacketized bitstream, to the jitter smoothing & bit-filling unit, wherein operation of the second switch is synchronized with operation of the first switch, and E) the jitter-smoothing and bit-filling unit, operably coupled to the second switch, for compensating for delay jitter introduced by the packet network by inserting stuffing bits to prevent a decoder buffer in the receiving terminal from overflowing and to convert the variable bit-rate bitstream back to a constant bit-rate bitstream in accordance with a predetermined scheme.

9. The transcoding device of claim 7 wherein the receiving audio processor comprises:

A) an audio partial decoder, operably coupled to receive an input audio bitstream, for partially decoding the input audio bitstream in accordance with a predetermined audio scheme, B) an audio activity detector, operably coupled to the audio partial decoder, for determining starting and ending points of talk spurts within the bitstream output of the audio partial decode, C) an on-off switch, operably coupled to the audio activity detector and to receive the input audio bitstream, for indicating said starting and ending points of talk spurts in the input audio bitstream by passing determined active portions of audio bitstream and blocking determined silence portions of audio bitstream to the audio packetizer, and D) an audio packetizer, operably coupled to the on-off switch, for packetizing the active portion of the audio bitstream into audio packets.

10. The transcoding device of claim 7 wherein the receiving audio processor comprises:

A) an audio depacketizer, operably coupled to receive audio packets, for depacketizing the received audio packets, B) a first switch, operably coupled to the audio depacketizer, for switching the depacketized audio packets to one of: a jitter smoothing and noise filling unit and a error concealment unit, C) an error concealment unit, operably coupled to the first switch, for providing error concealment for depacketized audio packets, D) a second switch, selectably operably coupled to one of: the error concealment unit and the first switch in accordance with a predetermined scheme, for passing one of: the error-concealed audio bitstream and the depacketized audio bitstream, to the jitter smoothing and noise filling unit, wherein operation of the second switch is synchronized with operation of the first switch, and E) a jitter smoothing and noise filling unit, operably coupled to the second switch and to a predetermined noise source, for providing network delay jitter compensation and for filling background noise to inactive audio signal portions to provide a continuous constant bit-rate bitstream.

11. A transcoding device at an entry node in a packet-based communication system for utilizing conversion of a constant bit-rate (CBR) multimedia bitstream to a corresponding variable bit-rate multimedia bitstream for efficient transmission of the bitstream, comprising:

A) a demultiplexer, operably coupled to receive a CBR multimedia bitstream, for demultiplexing said bitstream to provide constant bit-rate bitstreams that correspond to component media in the multimedia bitstream, B) a plurality of transmitting processors, operably coupled to the demultiplexer, each for processing a component constant bit-rate bitstream to provide a corresponding variable bit-rate component bitstream, packetizing said bitstream and transmitting said packetized bitstream over a packet network, wherein said entry node is an element of a communication system that further includes a transmitting terminal for generating the constant bit-rate (CBR) multimedia bitstream, an exit node for receiving the packetized bitstreams, and a receiving terminal operably coupled to the exit node, wherein the exit node comprises:

C) a plurality of receiving processors, each for receiving and processing a component variable bit-rate packetized bitstream to provide a corresponding constant bit-rate component bitstream, and D) a multiplexer, operably coupled to the plurality of receiving processors, for multiplexing the constant bit-rate component bitstreams and providing the multiplexed bitstream to the receiving terminal, wherein the transmitting video processor comprises:

E) a transcoder, operably coupled to receive a constant bit rate H.261 video bitstream, for converting said bitstream to a variable bit-rate H.261 bitstream with a reduced average bit-rate, F) a video packetizer, operably coupled to the transcoder, for packetizing the variable bit-rate H.261 bitstream, assigning a priority in accordance with a predetermined prioritization scheme and then transmitting the packetized bitstream to a packet network, and G) a traffic shaper, operably coupled to the video packetizer and coupled to transmit a quantization parameter to the transcoder, for providing a quantization parameter to the transcoder, wherein the traffic shaper determines the quantization parameter for the transcoder utilizing one of:
1) statistical information about a packet sequence from the video packet output from the video packetizer, and
2) packet network feedback congestion information, and wherein the transcoder adjusts a transcoder output bit-rate according to a predetermined transcoding scheme.

12. The transcoding device of claim 11 wherein the transcoder comprises:

A) a variable length code (VLC) decoder for receiving the constant bit-rate bitstream and for providing side information including loop filter control indicator, inter/intra mode indicator, and motion vectors, B) a first summer, operably coupled to the VLC decoder and to a DCT (discrete cosine transform) unit, for providing a first difference, i.e., a modified DCT, between a decoded DCT output by the VLC decoder and a predicted DCT quantization error output by the DCT unit, C) a quantizer, operably coupled to receive a quantization parameter from the traffic shaper and to receive the modified DCT for requantizing the modified DCT in accordance with the quantization parameter to provide a requantized DCT and for providing a new quantization step size to a VLC encoder, D) a second summer, operably coupled to the quantizer and to the first summer for providing a second difference, i.e., the DCT quantization error, between the requantized DCT and the modified DCT, E) an inverse DCT (IDCT) unit, operably coupled to the second summer, for determining a quantization error, F) a frame buffer, operably coupled to the IDCT unit, for providing frame buffering, G) an Inter/Intra switch, operably coupled to the frame buffer and coupled to receive an Inter/Intra mode indicator from the VLC decoder, for switching to permit/block transmission of the frame buffer output to a Motion Compensated (MC) Predictor in accordance with the Inter/Intra mode indicator, H) a MC Predictor, operably coupled to the Inter/Intra switch and to receive motion vectors from the VLC decoder, for providing a predicted quantization error, I) a loop filter switch, operably coupled to the MC Predictor and coupled to receive a loop filter control indicator from the VLC decoder for providing the predicted DCT quantization error to one of: a loop filter and a DCT unit in accordance with a loop filter control indicator, J) a loop filter, operably coupled to the loop filter switch, for filtering the predicted quantization error and providing a filtered predicted quantization error, K) a DCT unit, operably coupled to receive one of: the filtered predicted quantization error and the predicted quantization error in accordance with a state of the loop filter switch, for applying a DCT transform and for providing a predicted DCT quantization error, L) the VLC encoder, operably coupled to receive a requantized DCT from the quantizer, to receive a new quantization step size from the quantizer and to receive side information from the VLC decoder, for providing a variable bit-rate bitstream to the video packetizer, wherein elements B-k process a block of video data at a time.

13. The transcoding device of claim 11 wherein the video packetizer comprises:

A) a prioritizer for prioritizing the variable bit-rate bitstream to provide a high priority (HP) bitstream and a low priority (LP) bitstream, B) a high priority (HP) packetizer, operably coupled to the prioritizer, for receiving and packetizing the HP bitstream, C) a low priority (LP) packetizer, operably coupled to the prioritizer, for receiving and packetizing a LP bitstream, D) an interleaver, operably coupled to the HP packetizer and to the LP packetizer, for interleaving the HP packets and the LP packets in accordance with a predetermined scheme and outputting the interleaved packets to the packet network and to the traffic shaper, and E) an adaptive controller, operably coupled to the interleaver, for adjusting the prioritizer in accordance with a predetermined HP to LP ratio.

14. The transcoding device of claim 11 wherein the traffic shaper comprises:

A) a leaky bucket, operably coupled to receive packets from the packetizer and a token generation rate from a token generator, for maintaining bucket fullness in accordance with a predetermined scheme, B) the token generator, operably coupled to a switch, for setting a token generation rate in accordance with a predetermined scheme, C) a switch, operably coupled to receive packet network feedback congestion information, for on-off switching of network feedback information to the token generator in accordance with a predetermined scheme, and D) a quantization parameter calculator, operably coupled to the leaky bucket, for utilizing leaky bucket fullness level to provide a quantization parameter to the transcoder.

15. A method in a packet network-based transcoding entry node for a communication system for utilizing conversion of a constant bit-rate multimedia bitstream to a corresponding variable bit-rate multimedia bitstream for efficient transmission of bitstream, comprising the steps of:

A) demultiplexing, by a demultiplexer, the CBR multimedia bitstream to provide constant bit-rate component bitstreams that correspond component media in the multimedia bitstream, B) processing, by a plurality of transmitting processors, each component constant bit-rate bitstream to provide a corresponding variable bit-rate component bitstream, packetizing said bitstreams and transmitting said packetized bitstreams over a channel of at least a first packet network.

16. A method in a packet network-based transcoding entry node for a communication system for utilizing conversion of a constant bit-rate multimedia bitstream to a corresponding variable bit-rate multimedia bitstream for efficient transmission of bitstream, comprising the steps of;

A) demultiplexing by a demultiplexer, the CBR multimedia bitstream to provide constant bit-rate component bitstreams that correspond component media in the multimedia bitstream, B) processing, by a plurality of transmitting processors, each component constant bit-rate bitstream to provide a corresponding variable bit-rate component bitstream, packetizing said bitstreams and transmitting said packetized bitstreams over a channel of at least a first packet network, wherein the constant bit-rate multimedia bitstream includes constant bit-rate video and audio bitstreams and, where selected, a constant bit-rate data bitstream.

17. The method of claim 16 further including the steps of:

A) transcoding, by a transmitting (Tx) video processor, the constant bit-rate video bitstream into a modified variable bit-rate video bitstream in accordance with a predetermined bit syntax, packetizing the modified variable bit-rate video bitstream into variable bit-rate video packets and sending the variable bit-rate video packets over a channel of at least a first packet network, B) transcoding, by a transmitting (Tx) audio processor, the constant bit-rate audio bitstream into a variable bit-rate audio bitstream in accordance with a predetermined audio coding technique, packetizing the processed audio bitstream, and sending the packetized processed audio bitstream over a second channel of at least a first packet network, and C) where selected, processing, by a transmitting data processor, the constant bit-rate data bitstream into a variable bit-rate data bitstream in accordance with a predetermined data coding technique, packetizing the processed data bitstream, and sending the packetized data bitstream over a third channel of at least a first packet network.

18. The method of claim 17 wherein the predetermined bit syntax is a bit syntax predetermined by a receiving terminal.

19. The method of claim 17 wherein the predetermined audio coding technique is a technique used for processing the bitstreams coded using one of audio coding standards supported by an H.320 standard.

20. The method of claim 16 wherein said entry node is an element of a communication system that further includes a transmitting terminal for generating the constant bit-rate multimedia bitstream, an exit node for receiving the packetized bitstreams, and a receiving terminal operably coupled to the exit node, further including the steps, at the exit node, of:

A) receiving and processing, by a plurality of receiving processors, each component variable bit-rate packetized bitstream to provide a corresponding constant bit-rate component bitstream, and B) multiplexing, by a multiplexer, the constant bit-rate component bitstreams and providing the multiplexed bitstreams to the receiving terminal.

21. A method in a packet network-based transcoding entry node for a communication system for utilizing conversion of a constant bit-rate multimedia bitstream to a corresponding variable bit-rate multimedia bitstream for efficient transmission of bitstream, comprising the steps of:

A) demultiplexing, by a demultiplexer, the CBR multimedia bitstream to provide constant bit-rate component bitstreams that correspond component media in the multimedia bitstream, B) processing, by a plurality of transmitting processors, each component constant bit-rate bitstream to provide a corresponding variable bit-rate component bitstream, packetizing said bitstream, and transmitting said packetized bitstreams over a channel of at least a first packet network, wherein said entry node is an element of a communication system that further includes a transmitting terminal for generating the constant bit-rate multimedia bitstream, an exit node for receiving the packetized bitstreams, and a receiving terminal operably coupled to the exit node, further including the steps, at the exit node, of:

C) receiving and processing, by a plurality of receiving processors, each component variable bit-rate packetized bitstream to provide a corresponding constant bit-rate component bitstream, and D) multiplexing, by a multiplexer, the constant bit-rate component bitstreams and providing the multiplexed bitstreams to the receiving terminal, wherein the component variable bit-rate packetized bitstreams include a variable bit-rate video packetized bitstream, a variable bit-rate audio packetized bitstream, and, where selected, a variable bit-rate data packetized bitstream.

22. The method of claim 21 further including, by the plurality of receiving processors, the steps of:

A) receiving the variable bit-rate video packetized bitstream by a receiving (Rx) video processor and processing the variable bit-rate video packetized bitstream to provide a constant bit-rate video bitstream, B) receiving, by a receiving audio processor, the variable bit-rate audio packetized bitstream and processing the variable bit-rate audio packetized bitstream to provide a constant bit-rate audio bitstream, and C) where selected, receiving, by a receiving data processor, the variable bit-rate data packetized bitstream and processing the variable bit-rate data packetized bitstream to provide a constant bit-rate data stream.

23. The method of claim 22 wherein the steps implemented by the transmitting audio processor include the steps of:

A) partially decoding, by an audio partial decoder, the input audio bitstream in accordance with a predetermined audio scheme, B) determining, by an audio activity detector, starting and ending points of talk spurts within the bitstream output of the audio partial decode, C) utilizing an on-off switch, operably coupled to the audio activity detector and coupled to receive the input audio bitstream, for indicating said starting and ending points of talk spurts in the input audio bitstream by passing determined active portions of audio bitstream and blocking determined silence portions of audio bitstream to the audio packetizer, and D) utilizing an audio packetizer for packetizing the active portions of the audio bitstream into audio packets.

24. The method of claim 22 wherein the steps of the receiving audio processor include the steps of:

A) depacketizing, utilizing a depacketizer, the received audio packets,

B) switching, utilizing a first switch, the depacketized audio packets to one of: a jitter smoothing and noise filling unit and a error concealment unit, C) where selected, utilizing the error concealment unit providing error concealment for depacketized audio packets, D) passing, utilizing a second switch in accordance with the first switch, one of: the error-concealed audio bitstream and the depacketized audio bitstream to the jitter smoothing and noise filling unit, and E) providing, utilizing the jitter smoothing and noise filling unit, network delay jitter compensation and for filling background noise to inactive audio signal portions to provide a continuous constant bit-rate bitstream.

25. The method of claim 21 wherein the multimedia variable bit-rate packetized bitstream includes a variable bit-rate video component bitstream and a variable bit-rate audio component bitstream and, where selected, a variable bit-rate data component bitstream.

26. The method of claim 25 wherein the video component bitstream comprises a video bitstream coded at a constant bit-rate according to an H.261 video compression standard.

27. The method of claim 21 wherein the transmitting terminal and the receiving terminal utilize a constant bit-rate in accordance with an H.320 standard.

28. The method of claim 21 wherein the packet network is an asynchronous transfer mode network.

29. A method in a packet network-based transcoding entry node for a communication system for utilizing conversion of a constant bit-rate multimedia bitstream to a corresponding variable bit-rate multimedia bitstream for efficient transmission of bitstream, comprising the steps of:

A) demultiplexing, by a demultiplexer, the CBR multimedia bitstream to provide constant bit-rate component bitstreams that correspond component media in the multimedia bitstream, B) processing, by a plurality of transmitting processors, each component constant bit-rate bitstream to provide a corresponding variable bit-rate component bitstream, packetizing said bitstreams and transmitting said packetized bitstreams over a channel of at least a first packet network, wherein the constant bit-rate multimedia bitstream includes constant bit-rate video and audio bitstreams and, where selected, a constant bit-rate data bitstream, further including the steps of:

C) transcoding, by a transmitting (Tx) video processor, the constant bit-rate video bitstream into a modified variable bit-rate video bitstream in accordance with a predetermined bit syntax, packetizing the modified variable bit-rate video bitstream into variable bit-rate video packets and sending the variable bit-rate video packets over a channel of at least a first packet network, D) transcoding, by a transmitting (Tx) audio processor, the constant bit-rate audio bitstream into a variable bit-rate audio bitstream in accordance with a predetermined audio coding technique, packetizing the processed audio bitstream, and sending the packetized processed audio bitstream over a second channel of at least a first packet network, and E) where selected, processing, by a transmitting data processor, the constant bit-rate data bitstream into a variable bit-rate data bitstream in accordance with a predetermined data coding technique, packetizing the processed data bitstream, and sending the packetized data bitstream over a third channel of at least a first packet network, wherein the steps implemented by the transmitting video processor include the steps of:

F) converting, by a transcoder, a constant bit rate H.261 bitstream to a variable bit-rate H.261 bitstream with a reduced average bit-rate, G) packetizing, by a video packetizer, the variable bit-rate H.261 bitstream, assigning a priority in accordance with a predetermined priority scheme and then transmitting the packetized bitstream to a packet network, and H) utilizing a traffic shaper, operably coupled to the video packetizer and coupled to transmit a quantization parameter to the transcoder, for providing a quantization parameter to the transcoder, wherein the traffic shaper determines the quantization parameter for transmission to the transcoder utilizing one of:
 1) statistical information about a packet sequence from the video packet output from the video packetizer, and
 2) packet network feedback congestion information, and wherein the transcoder adjusts a transcoder output bit-rate according to a predetermined transcoding scheme.

30. The method of claim 29 wherein steps implemented by the receiving video processor include the steps of:

A) depacketizing, by a video depacketizer, the video packets into a variable bit-rate bitstream, B) switching, according to a preselected diversion scheme, the depacketized variable bit-rate bitstream to one of:
 1) an error concealment unit, and
 2) a jitter-smoothing and bit-filling unit, C) where selected, detecting, by the error concealment unit, errors in the depacketized bitstream caused by bit errors or packet loss and performing error concealment to reduce distortion for the bitstream, D) selectably switching, in accordance with a predetermined scheme, to pass one of: the error concealed video bitstream and the depacketized video bitstream, and D) compensating, by the jitter-smoothing and bit-filling unit, for delay jitter introduced by the packet network by inserting stuffing bits to prevent a decoder buffer in the receiving terminal from overflowing and to convert the variable bit-rate bitstream back to a constant bit-rate bitstream in accordance with a predetermined scheme.

31. The method of claim 29 wherein the steps implemented by the transcoder include the steps of:

A) receiving, by a variable length code (VLC) decoder, the constant bit-rate bitstream and providing side information including loop filter control indicator, Inter/Intra mode indicator, and motion vectors, B) providing, by a first summer, a first difference, i.e., a modified DCT (discrete cosine transform), between a decoded DCT output by the VLC decoder and a predicted DCT quantization error output by the DCT unit, C) utilizing a quantizer to receive a quantization parameter from the traffic shaper and the modified DCT for requantizing the modified DCT in accordance with the quantization parameter and providing a requantized DCT and providing a new quantization step size to a VLC encoder, D) utilizing a second summer for providing a second difference, i.e., the DCT quantization error, between the requantized DCT and the modified DCT, E) determining a quantization error by an inverse DCT (IDCT) unit, F) providing frame buffering by a frame buffer, G) utilizing an Inter/Intra switch, where selected, to provide an Inter/Intra mode indicator from the VLC decoder for selectably transmitting the frame buffer output to a Motion Compensated (MC) Predictor in accordance with a predetermined scheme, H) upon receiving motion vectors from the VLC decoder, providing a motion control prediction utilizing the MC predictor, I) upon receiving a loop filter control indicator from the VLC decoder by a loop filter switch, providing a predicted DCT quantization error from the MC predictor to one of: a loop filter and the DCT unit in accordance with a loop filter control indicator, J) where indicated by the loop control indicator, filtering the predicted quantization error and providing a filtered predicted quantization error, K) applying a DCT to one of: the filtered predicted quantization error and the predicted quantization error, in accordance with a state of the loop filter switch, to provide a predicted DCT quantization error, and L) upon receiving a requantized DCT from the quantizer, receiving a new quantization step size from the quantizer and receiving side information from the VLC decoder, providing, by the VLC encoder, a variable bit-rate bitstream to the video packetizer, wherein said steps B-K are applied to a block of video data.

32. The method of claim 29 wherein the steps implemented by the video packetizer include the steps of:

A) prioritizing, by a prioritizer, the variable bit-rate bitstream to provide a high priority (HP) bitstream and a low priority (LP) bitstream, B) receiving and packetizing the HP bitstream by a high priority (HP) packetizer, C) receiving and packetizing a LP bitstream by a low priority (LP) packetizer, D) interleaving, by an interleaver, the HP packets and the LP packets in accordance with a predetermined scheme and outputting the interleaved packets to the packet network and to the traffic shaper, and E) adjusting, by an adaptive controller, the prioritizer in accordance with a predetermined HP to LP ratio.

33. The method of claim 29 wherein the steps implemented by the traffic shaper include the steps of:

A) receiving, by a leaky bucket, packets from the packetizer and a token generation rate from a token generator and maintaining bucket fullness in accordance with a predetermined scheme, B) setting a token generation rate, by a token generator, in accordance with a predetermined scheme, C) on-off switching of network feedback information, by a switch, to the token generator in accordance with a predetermined scheme, and D) utilizing a leaky bucket fullness level, by a quantization parameter calculator, to provide a quantization parameter to the transcoder.

* * * * *